(12) United States Patent
Zuckerman et al.

(10) Patent No.: US 10,384,871 B2
(45) Date of Patent: Aug. 20, 2019

(54) NEXT GENERATION ON-ROAD VEHICLES AND RELATED METHODS OF USAGE

(71) Applicants: Gal Zuckerman, Holon (IL); Moshe Salhov, Herzeliya (IL)

(72) Inventors: Gal Zuckerman, Holon (IL); Moshe Salhov, Herzeliya (IL)

(*) Notice: Subject to any disclaimer, the term of this patent is extended or adjusted under 35 U.S.C. 154(b) by 0 days.

(21) Appl. No.: 15/898,473

(22) Filed: Feb. 17, 2018

(65) Prior Publication Data

US 2018/0265293 A1    Sep. 20, 2018

Related U.S. Application Data

(60) Provisional application No. 62/473,436, filed on Mar. 19, 2017.

(51) Int. Cl.
| | |
|---|---|
| B65G 1/06 | (2006.01) |
| B65G 1/137 | (2006.01) |
| B65G 1/04 | (2006.01) |
| G05D 1/02 | (2006.01) |
| G06Q 10/08 | (2012.01) |

(52) U.S. Cl.
CPC ........... *B65G 1/065* (2013.01); *B65G 1/0414* (2013.01); *B65G 1/137* (2013.01); *G05D 1/0212* (2013.01); *G05D 1/0225* (2013.01); *G05D 1/0274* (2013.01); *G06Q 10/08* (2013.01); *G05D 2201/0213* (2013.01)

(58) Field of Classification Search
CPC .. B60P 7/06; B60P 7/08; B60P 7/0807; B60P 7/13; B60P 3/00; B60P 1/02; B65G 1/065
See application file for complete search history.

(56) References Cited

U.S. PATENT DOCUMENTS

| | | | | |
|---|---|---|---|---|
| 3,197,229 A | * | 7/1965 | Houlton ................ | B66C 19/005 180/236 |
| 3,688,931 A | * | 9/1972 | Hans Tax .............. | B66C 19/007 414/460 |
| 4,087,013 A | * | 5/1978 | Wiley, Jr. ............. | B60P 1/6445 254/108 |
| 4,279,347 A | * | 7/1981 | Appleman ............ | B66C 19/007 212/274 |

(Continued)

OTHER PUBLICATIONS

Solon, Olivia "Self-driving trucks: what's the future for america's 3.5 million truckers?" The Guardian dated Jun. 17, 2016.*

*Primary Examiner* — Erez Gurari
(74) *Attorney, Agent, or Firm* — Active Knowledge Ltd.

(57) ABSTRACT

On-road autonomous vehicles and other vehicles operative to: autonomously collect and transport a load over public roads, autonomously collect and transport a passenger in a cabin, autonomously collect transport and place a functional load according to a request, autonomously collect and use a functional load, exchange a functional load between at least two on-road autonomous vehicles in a convoy, lift and transport a load by at least two on-road autonomous vehicles, charge batteries of the on-road autonomous vehicle on the move, provide a hybrid air-gap and mechanical protection for a passenger cabin, protect the on-road vehicle from impact with foreign objects, control a length thereof, reduce drag on the vehicle, and adapt to carry a long load.

2 Claims, 21 Drawing Sheets

(56) References Cited

U.S. PATENT DOCUMENTS

| | | | | |
|---|---|---|---|---|
| 4,381,839 A * | 5/1983 | Engler | B66C 19/02 | 212/314 |
| 4,500,248 A * | 2/1985 | Kramer | B60P 1/6445 | 414/351 |
| 4,551,059 A * | 11/1985 | Petoia | B66C 19/005 | 414/459 |
| 4,599,030 A * | 7/1986 | Skaalen | B62D 7/1509 | 180/236 |
| 5,735,416 A * | 4/1998 | Jussila | B66C 9/10 | 180/23 |
| 5,839,874 A * | 11/1998 | Johnston | B66C 19/005 | 414/459 |
| 5,967,348 A * | 10/1999 | Jussila | B62D 7/09 | 180/264 |
| 6,071,062 A * | 6/2000 | Warhurst | B60P 1/6445 | 414/347 |
| 6,155,770 A * | 12/2000 | Warhurst | B60P 1/6445 | 414/347 |
| 6,286,696 B1 * | 9/2001 | Van Gorp | B66C 13/00 | 212/343 |
| 6,345,724 B1 * | 2/2002 | Masumoto | B66C 11/20 | 212/173 |
| 6,539,877 B1 * | 4/2003 | Saunders | B61B 13/00 | 104/242 |
| D538,002 S * | 3/2007 | Kuhn | D34/28 | |
| 7,195,250 B2 * | 3/2007 | Knox | B60G 17/0165 | 280/5.515 |
| 7,547,177 B2 * | 6/2009 | Waisanen | B66C 1/62 | 414/459 |
| 7,779,761 B2 * | 8/2010 | Barry | B61K 1/00 | 104/20 |
| 7,811,044 B2 * | 10/2010 | Warhurst | B60P 1/6445 | 414/458 |
| 7,866,933 B2 * | 1/2011 | Welch | B60P 1/6445 | 414/458 |
| 8,312,817 B2 * | 11/2012 | Barry | B60P 3/34 | 104/20 |
| 8,544,163 B2 * | 10/2013 | Sarh | B25J 5/00 | 29/525.06 |
| 9,010,253 B2 * | 4/2015 | Barry | B61F 13/00 | 105/215.2 |
| 9,592,998 B2 * | 3/2017 | Pilgrim | B66C 19/005 | |
| 9,701,518 B2 * | 7/2017 | Rosenstrom | B66C 9/04 | |
| 9,891,629 B2 * | 2/2018 | Murray | A01D 42/00 | |
| 2002/0001515 A1 * | 1/2002 | Lukumaa | B66C 19/007 | 414/460 |
| 2003/0116373 A1 * | 6/2003 | Miller | B60T 7/22 | 180/167 |
| 2004/0016581 A1 * | 1/2004 | Watanabe | B66F 9/063 | 180/168 |
| 2005/0047895 A1 * | 3/2005 | Lert, Jr. | B65G 1/0492 | 414/273 |
| 2012/0321423 A1 * | 12/2012 | MacKnight | H01L 21/67276 | 414/664 |
| 2013/0017047 A1 * | 1/2013 | Holland | B60P 1/02 | 414/495 |
| 2014/0017051 A1 * | 1/2014 | Coogan | G21F 5/14 | 414/618 |
| 2014/0060949 A1 * | 3/2014 | Anderson | G01S 5/021 | 180/167 |
| 2015/0105965 A1 * | 4/2015 | Blackwell | A01B 59/002 | 701/28 |
| 2015/0125244 A1 * | 5/2015 | Coogan | B66C 1/66 | 414/399 |
| 2017/0015531 A1 * | 1/2017 | Schults | B66C 9/12 | |
| 2018/0237086 A1 * | 8/2018 | Evans | B64C 39/024 | |
| 2018/0265293 A1 * | 9/2018 | Zuckerman | B65G 1/065 | |

\* cited by examiner

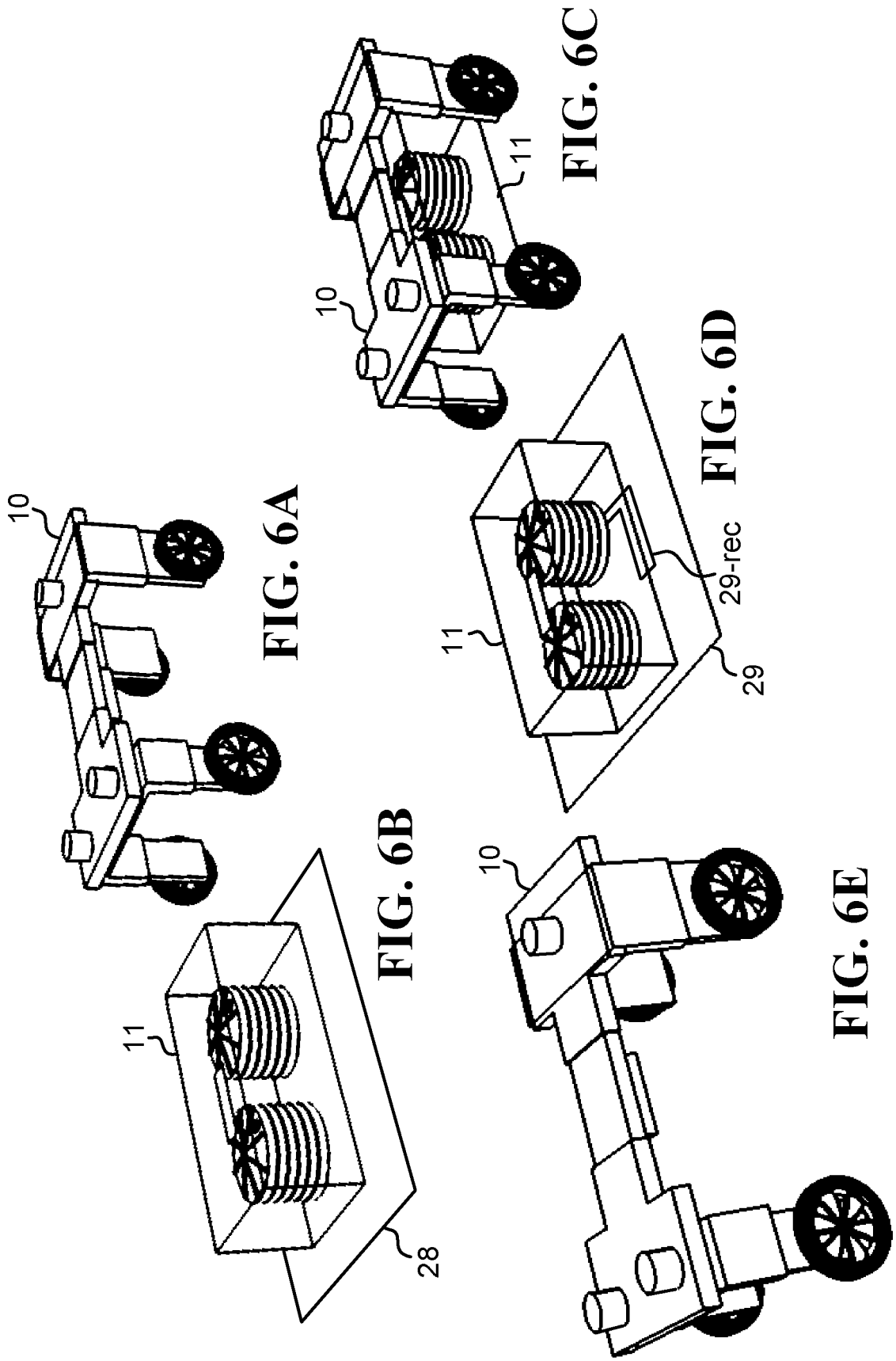

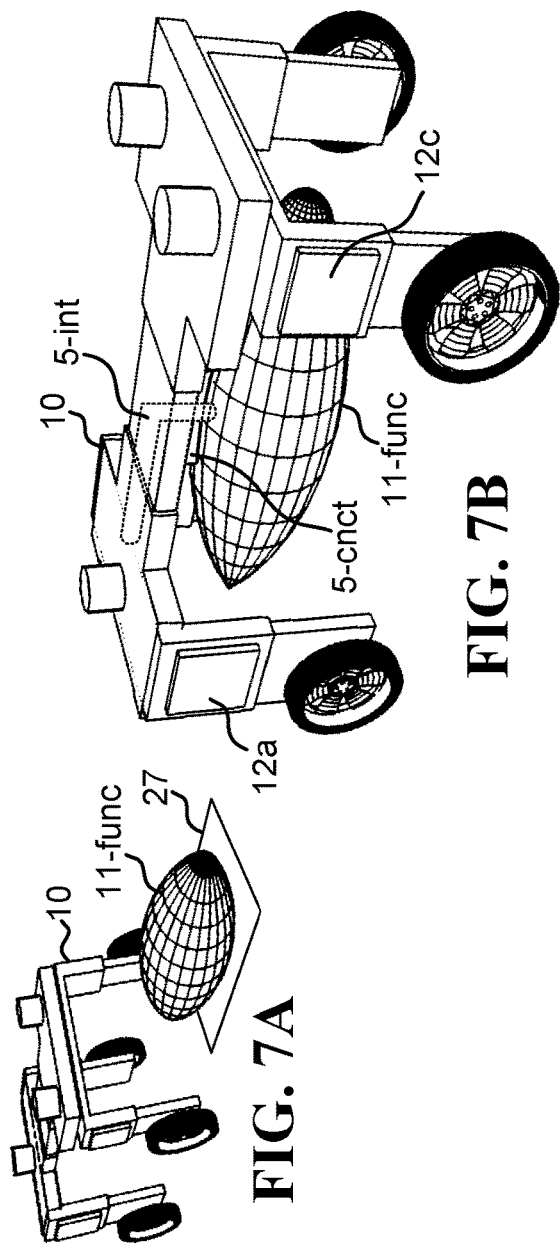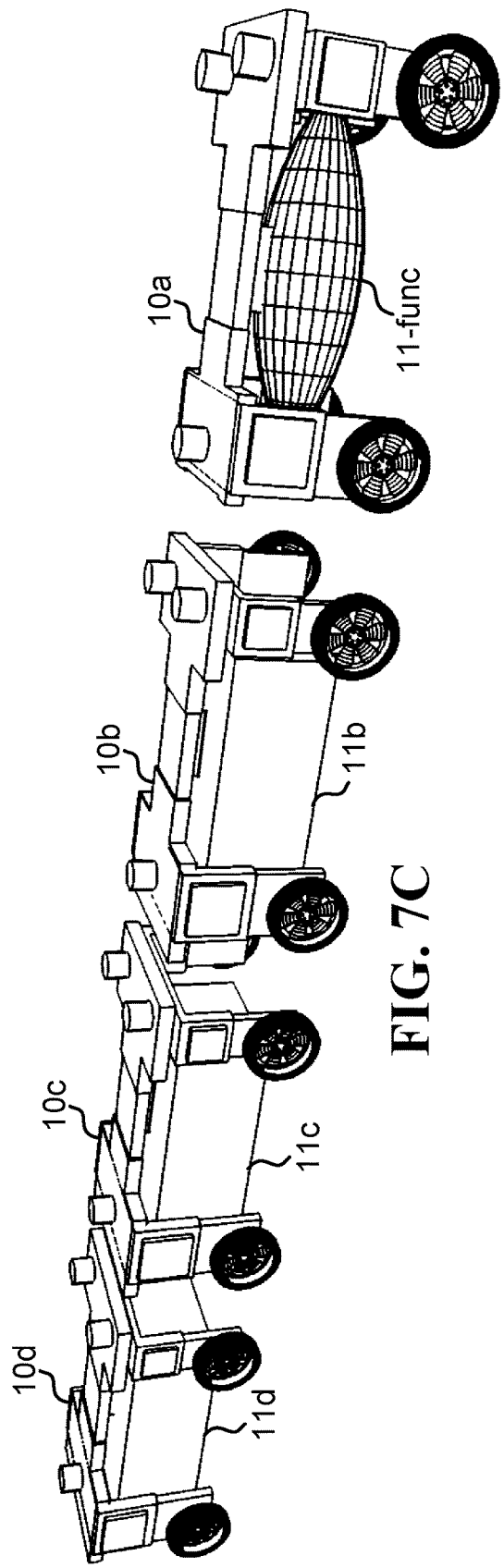

NEXT GENERATION ON-ROAD VEHICLES AND RELATED METHODS OF USAGE

CROSS REFERENCE TO RELATED APPLICATIONS

This Application claims priority to U.S. Provisional Patent Application No. 62/473,436, filed on Mar. 19, 2017, which is hereby incorporated by reference.

BACKGROUND

Current designs of on-road vehicles are ineffective in performing various tasks associated with load handling, transport, energy utilization, and the execution of autonomous procedures.

SUMMARY

One embodiment is a system operative to transport passengers in a cabin and also transport cargo loads, comprising: an autonomous on-road vehicle operative to straddle over loads such as cabins operative to contain passengers and such as cargo loads; a cabin operative to contain passengers, in which the cabin is currently located at a certain parking location; and a cargo load; wherein, the system is configured to: autonomously transport the cargo load, using the autonomous on-road vehicle, to a certain location; autonomously release the cargo load at the certain location; self-drive the on-road autonomous vehicle, which is now free of the cargo load, to the certain parking location; upon arrival of the on-road autonomous vehicle to said certain parking location: straddle autonomously, the on-road autonomous vehicle, over the cabin, thereby allowing the on-road autonomous vehicle to grab and lift autonomously the cabin; self-drive the on-road autonomous vehicle to a pick-up location, while the cabin is hanging underneath the on-road autonomous vehicle; and pick-up a passenger at the pick-up location.

One embodiment is a method (FIG. 5D) for autonomously collecting and transporting a passenger in a cabin, comprising: receiving, in conjunction with an on-road autonomous vehicle, a request to collect-and-transport a passenger inside a cabin located in a certain location; self-driving, by the on-road autonomous vehicle, from a current location of the on-road autonomous vehicle to said certain location of the cabin; upon arrival to said certain location: straddling autonomously, by the on-road autonomous vehicle, over the cabin, thereby allowing the on-road autonomous vehicle to grab and lift autonomously the cabin together with the passenger above ground; and transporting autonomously the cabin together with the passenger, by the on-road autonomous vehicle, while the cabin is hanging underneath the on-road autonomous vehicle.

One embodiment is an on-road autonomous vehicle operative to autonomously collect and transport a load over public roads, comprising: an upper horizontal structure elevated above ground by vertical structures mounted on at least four wheels touching ground, so as to create a certain clearance above ground for at least a first connector associated with the upper horizontal structure and attached thereunder; a control sub-system comprising a processing unit and a plurality of sensors and actuators, in which the control sub-system is configured to generate, in real-time, a three-dimensional representation of surrounding environment using data collected by the plurality of sensors; and at least a first linear actuator configured to control and set said certain clearance of the first connector, by causing the first connector, or the entire upper horizontal structure, to move up or down relative to ground; wherein the control sub-system is further configured to use said three-dimensional representation, said actuators, and said processing unit in conjunction with a set of public-road self-driving directives, to: (i) self-drive the on-road autonomous vehicle, over public roads and alongside regular car traffic, to a location in which a first load is parked, (ii) position the on-road autonomous vehicle in front of the load, and (iii) straddle the on-road autonomous vehicle over the first load, such that said first connector is brought to a predetermined position over the first load; and the control sub-system is further configured to use the first linear actuator to: (i) lower the first connector into mechanical contact with the first load thereby allowing the connector to connect to or grab the first load, and (ii) lift the first load above ground into a position operative to self-transport the first load.

One embodiment is an on-road autonomous vehicle operative to autonomously collect and transport a load over public roads.

One embodiment is a method for autonomously collecting and transporting a load over public roads.

One embodiment is another method for autonomously collecting and transporting a load over public roads.

One embodiment is a method for autonomously collecting and transporting a passenger in a cabin.

One embodiment is a method for requesting autonomous collection and transporting of a passenger in a cabin.

One embodiment is a method for autonomously collecting transporting and placing a functional load according to a request.

One embodiment is a method for autonomously collecting and using a functional load.

One embodiment is a method for exchanging a functional load between at least two on-road autonomous vehicles in a convoy.

One embodiment is a method for cooperatively lifting and transporting a load by at least two on-road autonomous vehicles.

One embodiment is a method for charging batteries of an on-road autonomous vehicle on the move.

One embodiment is a system operative to provide a hybrid air-gap and mechanical protection for a passenger cabin.

One embodiment is a system operative to protect an on-road vehicle from impact with foreign objects.

One embodiment is an on-road vehicle operative to control a length thereof.

One embodiment is a combined vehicle-and-load arrangement operative to reduce drag on the vehicle.

One embodiment is a method for adjusting an on-road autonomous vehicle to carry a long load.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings:

FIG. 6A illustrates one embodiment of an on-road autonomous vehicle self-driving to a location in which a functional load is located;

FIG. 6B illustrates one embodiment of the functional load awaiting arrival of the on-road autonomous vehicle;

FIG. 6C illustrates one embodiment of the on-road autonomous vehicle picking up and transporting the functional load;

FIG. 6D illustrates one embodiment of the functional load after being placed by the on-road autonomous vehicle at a particular location operative to work in conjunction with or support the functional load;

FIG. 6E illustrates one embodiment of the on-road autonomous vehicle driving away after placing the functional load at the particular location;

FIG. 7A illustrates one embodiment of an on-road autonomous vehicle self-driving to a location in which a functional load is located;

FIG. 7B illustrates one embodiment of the on-road autonomous vehicle picking up the functional load and using a function associated with the functional load;

FIG. 7C illustrates one embodiment of a convoy of several on-road autonomous vehicles in which one of the on-road autonomous vehicles is carrying a functional load;

DETAILED DESCRIPTION

Figure 1A:
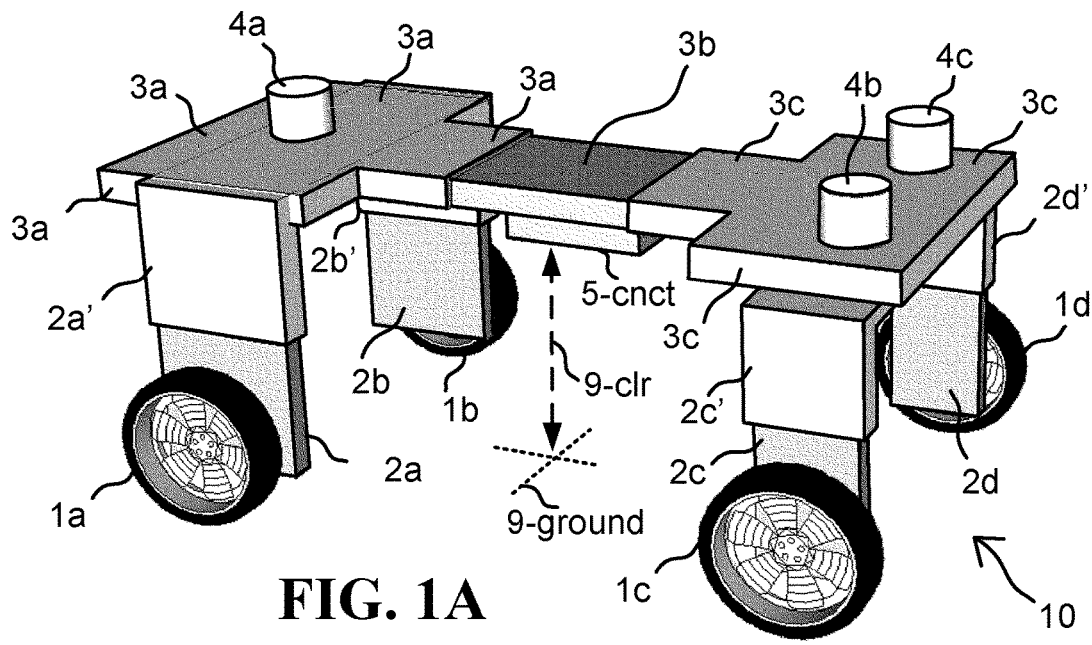
FIG. 1A illustrates one embodiment of an on-road autonomous vehicle operative to autonomously collect and transport a load over public roads.

FIG. 1A illustrates one embodiment of an on-road autonomous vehicle 10 operative to autonomously collect and transport a load over public roads. The on-road autonomous vehicle 10 comprises wheels 1 (1a, 1b, 1c, 1d) touching ground 9-ground, vertical structures 2 (2a, 2b, 2c), 2' (2a', 2b', 2c') mounted on the wheels, an upper horizontal structure 3 (3a, 3b, 3c), a plurality of sensors 4 (4a, 4b, 4c), and a first connector 5-cnct having a certain clearance 9-clr above ground 9-ground.

Figure 1B:
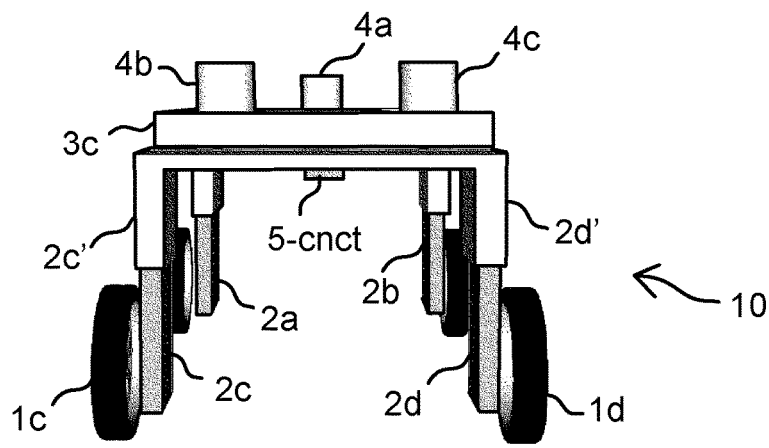
FIG. 1B illustrates one embodiment of the on-road autonomous vehicle as seen from a front view.

FIG. 1B illustrates one embodiment of the on-road autonomous vehicle 10 as seen from a front view.

Figure 1C:
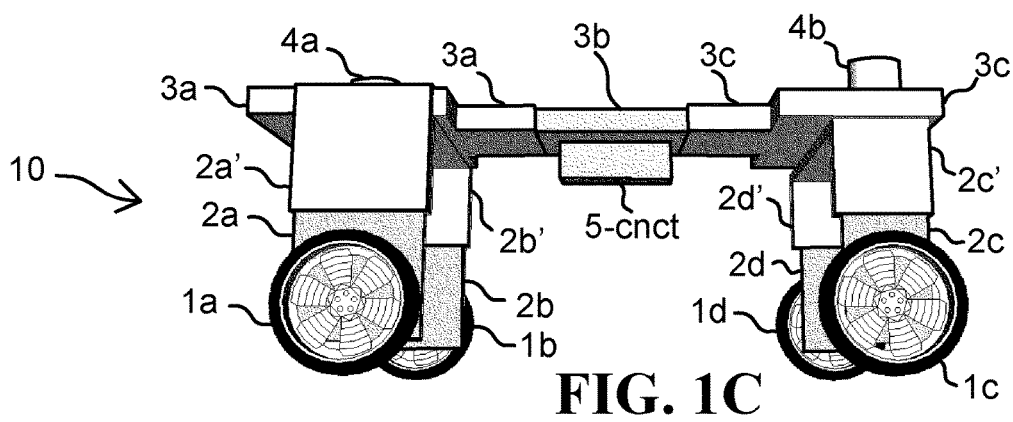
FIG. 1C illustrates one embodiment of the on-road autonomous vehicle as seen from a side view.

FIG. 1C illustrates one embodiment of the on-road autonomous vehicle 10 as seen from a side view.

Figure 1D:
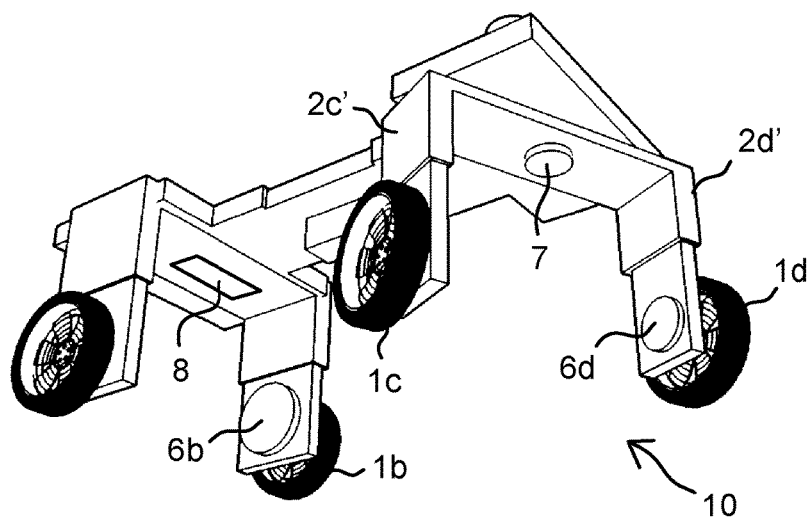
FIG. 1D illustrates one embodiment of the on-road autonomous vehicle as seen from below.

FIG. 1D illustrates one embodiment of the on-road autonomous vehicle 10 as seen from below. The on-road autonomous vehicle 10 further comprises a control sub-system 4 (FIG. 1A), 6, 7, 8 comprising a processing unit 8 and a plurality of sensors 4 (4a, 4b, 4c, FIG. 1A) and actuators 6, 7.

Figure 2A:
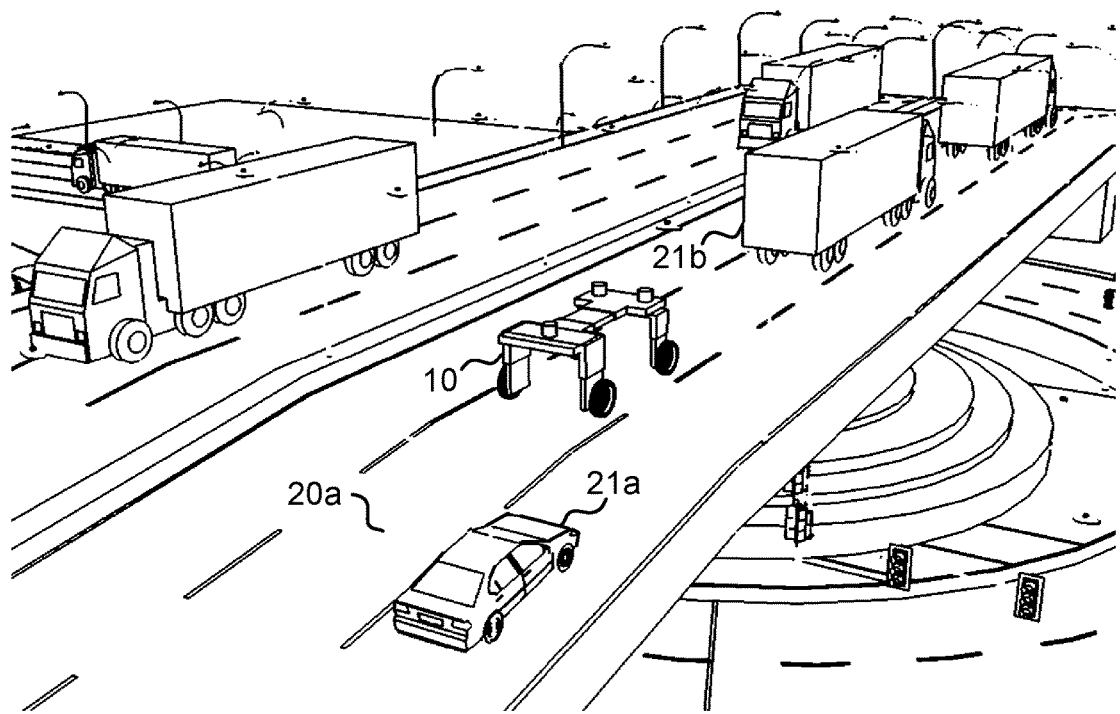
FIG. 2A illustrates one embodiment of an on-road autonomous vehicle self-driving without a load over a public road and alongside regular traffic.

FIG. 2A illustrates one embodiment of the on-road autonomous vehicle 10 self-driving without the load over a public road 20a and alongside regular traffic 21a, 21b.

Figure 2B:
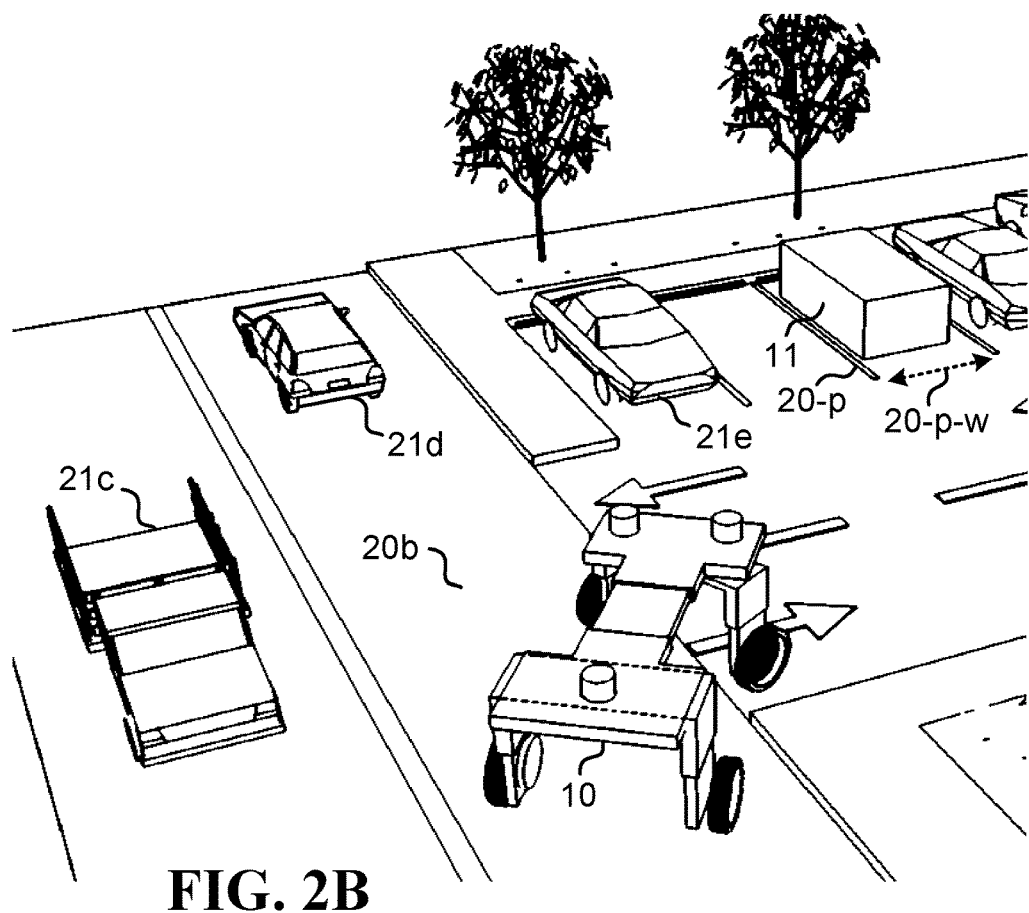
FIG. 2B illustrates one embodiment of the on-road autonomous vehicle arriving at a parking lot in which a load is parked.

FIG. 2B illustrates one embodiment of the on-road autonomous vehicle 10 arriving at a parking lot 20-p in which the load 11 is parked. The parking lot 20-p has a certain width 20-p-w. 21c, 21d, 21e are other vehicles, and 20b is a public road.

Figure 2C:
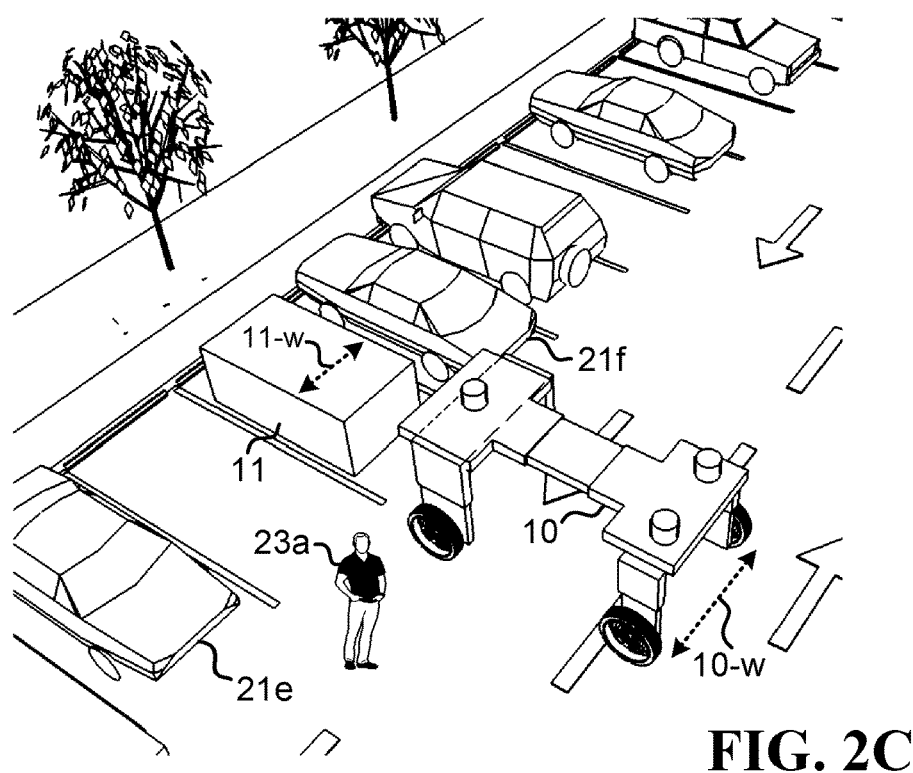
FIG. 2C illustrates one embodiment of the on-road autonomous vehicle getting ready to pick up the load.

FIG. 2C illustrates one embodiment of the on-road autonomous vehicle 10 getting ready to pick up the load 11. The load has a certain width 11-w, and the on-road autonomous vehicle 10 has a certain width 10-w. 23a is a pedestrian, and 21f is a vehicle parking alongside the load 11.

Figure 3A:
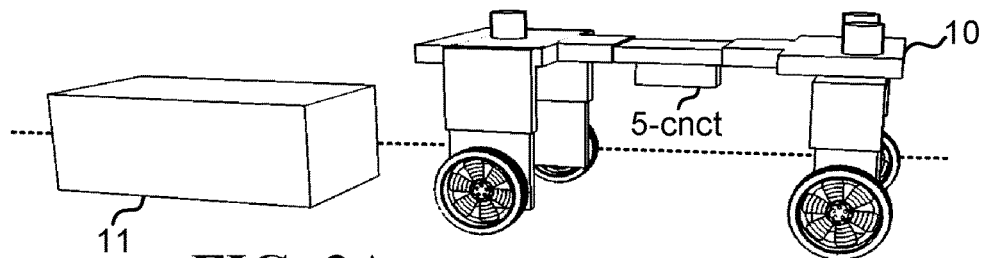
FIG. 3A illustrates one embodiment of an on-road autonomous vehicle getting ready to pick up a load.

FIG. 3A illustrates one embodiment of the on-road autonomous vehicle 10 getting ready to pick up the load 11.

Figure 3B:
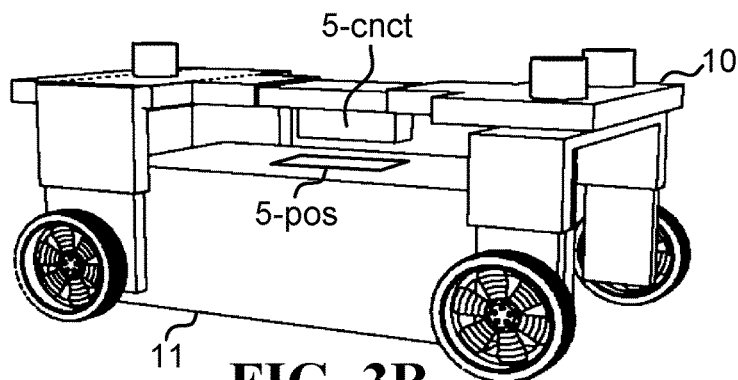
FIG. 3B illustrates one embodiment of the on-road autonomous vehicle moving/straddling over the load.

FIG. 3B illustrates one embodiment of the on-road autonomous vehicle 10 moving/straddling over the load 11 and getting the connector 5-cnct over a certain position 5-pos associated with the load 11.

Figure 3C:
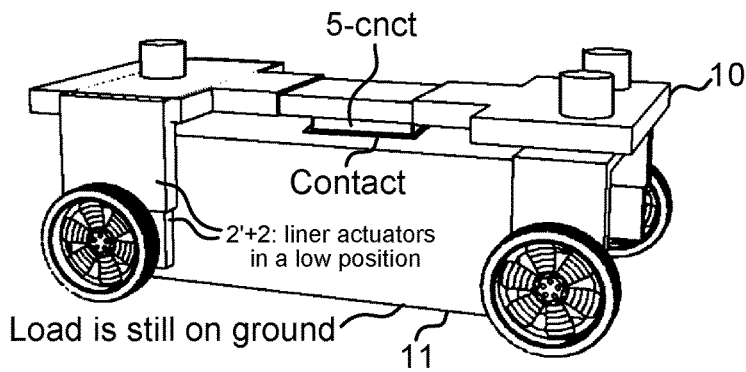
FIG. 3C illustrates one embodiment of the on-road autonomous vehicle getting into a lower position and grabbing the load.

FIG. 3C illustrates one embodiment of the on-road autonomous vehicle 10 getting into a lower position and grabbing the load 11.

Figure 3D:
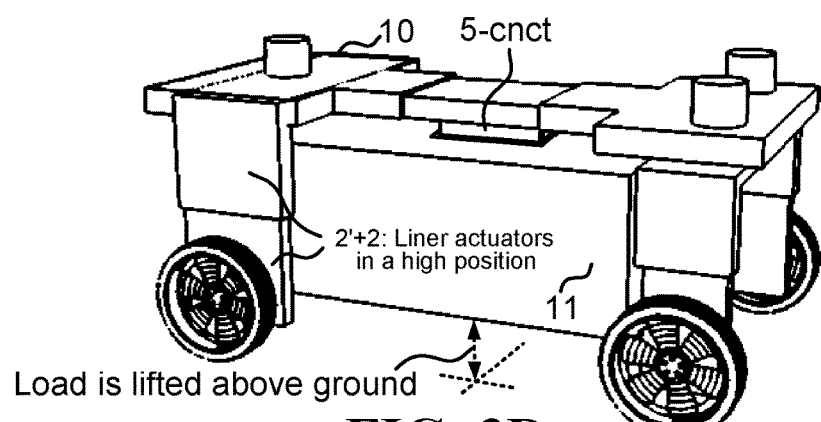
FIG. 3D illustrates one embodiment of the on-road autonomous vehicle picking up the load.

FIG. 3D illustrates one embodiment of the on-road autonomous vehicle 10 picking up the load 11.

Figure 4A:
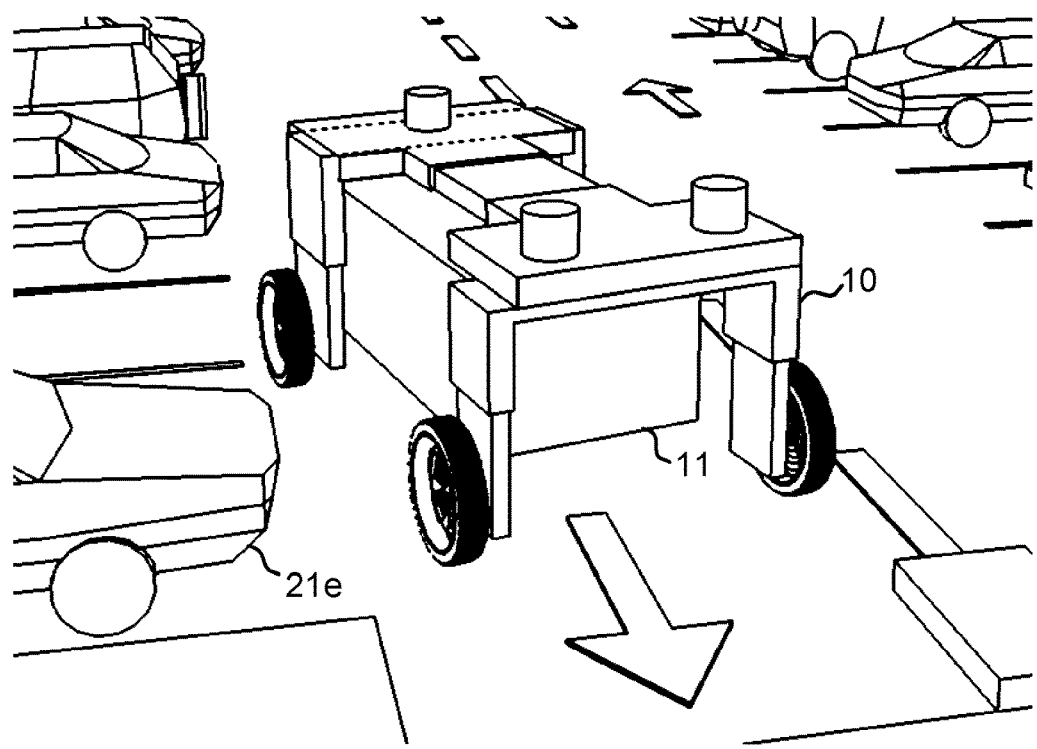
FIG. 4A illustrates one embodiment of an on-road autonomous vehicle driving away with a load that was previously parked in a parking lot.

FIG. 4A illustrates one embodiment of the on-road autonomous vehicle 10 driving away with the load 11 that was previously parked in the parking lot.

Figure 4B:
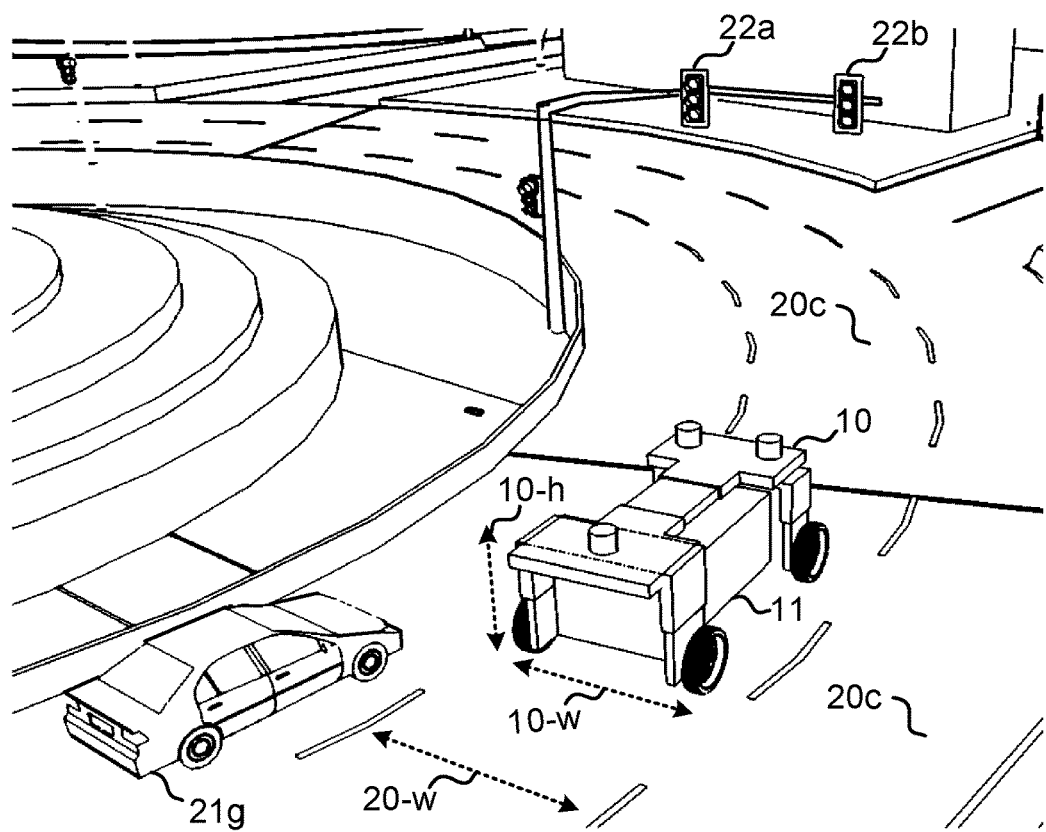
FIG. 4B illustrates one embodiment of the on-road autonomous vehicle self-driving with the load over a public road and alongside regular traffic.

FIG. 4B illustrates one embodiment of the on-road autonomous vehicle 10 self-driving with the load 11 over a public road 20c and alongside regular traffic 21g. 22a, 22b are traffic lights or other traffic signs. The public road 20c has a certain lane width 20-w. The on-road autonomous vehicle 10 has a certain width 10-w and a certain height 10-h.

In one embodiment, the on-road autonomous vehicle 10 is operative to autonomously collect and transport loads over public roads.

In one embodiment, the on-road autonomous vehicle comprises an upper horizontal structure 3 (3a, 3b, 3c) elevated above ground 9-ground (FIG. 1A) by vertical structures 2 (2a, 2b, 2c), 2' (2a', 2b', 2c') mounted on at least four wheels 1 (1a, 1b, 1c, 1d) touching ground 9-ground, so as to create a certain clearance 9-clr above ground for at least a first connector 5-cnct associated with the upper horizontal structure 3 and attached thereunder.

In one embodiment, the on-road autonomous vehicle comprises a control sub-system 4, 6, 7, 8 comprising a processing unit 8 (FIG. 1D) and a plurality of sensors 4 (4a, 4b, 4c) and actuators 6, 7 (FIG. 1D), in which the control sub-system is configured to generate, in real-time, a three-dimensional representation of surrounding environment using data collected by the plurality of sensors 4.

In one embodiment, the on-road autonomous vehicle comprises at least a first linear actuator 2'+2 (2' moving up and down relative to 2, i.e. 2a' moving relative to 2a, 2b' moving relative to 2b, 2c' moving relative to 2c, and 2d' moving relative to 2d) configured to control and set said certain clearance 9-clr of the first connector 5-cnct, by causing the first connector 5-cnct, or the entire upper horizontal structure 3, to move up or down relative to ground 9-ground.

In one embodiment, the control sub-system 4, 6, 7, 8 is further configured to use said three-dimensional representation, said actuators 6, 7, and said processing unit 8 in conjunction with a set of public-road self-driving directives, to: (i) self-drive (FIG. 2A, FIG. 2B) the on-road autonomous vehicle 10, over public roads 20a (FIG. 2A), 20b (FIG. 2B) and alongside regular car traffic 21a, 21b, 21c, 21d, 21e, 21f (FIG. 2A, FIG. 2B, FIG. 2C), to a location in which a first load 11 (FIG. 2B) is parked, (ii) position the on-road autonomous vehicle 10 in front of the load 11 (FIG. 2C, FIG. 3A), and (iii) straddle the on-road autonomous vehicle 10 over the first load 11 (FIG. 3B), such that said first connector 5-cnct is brought to a predetermined position 5-pos over the first load 11 (FIG. 3B).

In one embodiment, the control sub-system 4, 6, 7, 8 is further configured to use the first linear actuator 2'+2 to: (i) lower (FIG. 3C) the first connector 5-cnct into mechanical contact with the first load 11 thereby allowing the connector to connect to or grab the first load, and (ii) lift (FIG. 3D) the first load 11 above ground into a position operative to self-transport (FIG. 4A, FIG. 4B) the first load 11 over public roads 20c (FIG. 4B) and alongside regular car traffic 21e (FIG. 4A), 21g (FIG. 4B).

In one embodiment, the plurality if sensors 4 comprises a plurality of digital cameras together covering front, sides, and back of the on-road autonomous vehicle 10, thereby facilitating said generation of three-dimensional representation of surrounding environment.

In one embodiment, the plurality of sensors 4 comprises at least one radar device, thereby farther facilitating said generation of three-dimensional representation of surrounding environment.

In one embodiment, the plurality if sensors 4 comprises at least one light-detection-and-ranging (LIDAR) laser device, thereby farther facilitating said generation of three-dimensional representation of surrounding environment.

In one embodiment, the plurality of sensors 4 comprises at least two of: (i) a plurality of digital cameras, (ii) a LIDAR laser device, and (iii) a radar device, in which said generation of three-dimensional representation of surrounding environment is achieved using data fusion techniques acting on a combination of signals generated in real time by the plurality of sensors.

In one embodiment, said surrounding environment comprises at least the public roads 20a (FIG. 2A), 20b (FIG. 2B), 20c (FIG. 4B) surrounding the on-road autonomous vehicle 10, regular car traffic 21a, 21b, 21c, 21d, 21e, 21f, 21g surrounding the on-road autonomous vehicle 10, traffic lights 22a, 22b (FIG. 4B) and other traffic signs surrounding the on-road autonomous vehicle 10, and pedestrians 23a (FIG. 2C) surrounding the on-road autonomous vehicle 10, in which said three-dimensional representation in conjunction with said set of public-road self-driving directives are operative to facilitate said self-driving.

In one embodiment, said plurality of sensors 4 in conjunction with said data fusion and three-dimensional representation of surrounding environment are operative to detect said load 11 and to facilitate said positioning (FIG. 2C, FIG. 3A) of the on-road autonomous vehicle 10 in front of the load and said straddling (FIG. 3B) of the on-road autonomous vehicle 10 over the load 11.

In one embodiment, said on-road autonomous vehicle 10 is narrow enough to facilitate said self driving over public roads 20 and in conjunction with a width 20-$w$ (FIG. 4B) associated with a standard lane in public roads 20$c$, in which said standard lane has the width 20-$w$ of between 2.5 (two point five) meters and 3.7 (three point seven) meters. In one embodiment, the on-road autonomous vehicle 10 has a width 10-$w$ (FIG. 4B) of below 2.5 (two point five) meters. In one embodiment, said load 11 has a width 11-$w$ (FIG. 2C) of below 2 meters, and said load 11 is narrower than said on-road autonomous vehicle 10 (i.e., 11-$w$ is narrower than 10-$w$ in FIG. 2C), in order to facilitate said straddling (FIG. 3B) of the on-road autonomous vehicle 10 over the load 11.

In one embodiment, said location in which the load 11 is parked is a standard parking lot 20-$p$ (FIG. 2B) in a parking area, in which said standard parking lot has a width 20-$p$-$w$ of between 2.3 (two point three) meters and 2.7 (two point seven) meters, and said on-road autonomous vehicle 10 is narrow enough to facilitate said straddling of the on-road autonomous vehicle over the load 11 while the load is parked in said standard parking lot 20-$p$ and without the on-road autonomous vehicle exceeding the width 20-$p$-$w$ of the standard parking lot (i.e., 11-$w$ is narrower than 10-$w$, and 10-$w$ is narrower than 20-$p$-$w$). In one embodiment, the on-road autonomous vehicle 10 has a width 10-$w$ of below 2.3 (two point three) meters. In one embodiment, said load 11 has a width 11-$w$ of below 1.8 (one point eight) meters, and said load 11 is narrower than said on-road autonomous vehicle 10, in order to facilitate said straddling of the on-road autonomous vehicle 10 over the load 11 while the load is parked in said standard parking lot 20-$p$.

In one embodiment, a height 10-$h$ (FIG. 4B) of said on-road autonomous vehicle 10 does not exceed a width 10-$w$ of the on-road autonomous vehicle 10, thereby facilitating a center of gravity which is low enough to facilitate regular car traffic maneuvers in conjunction with said public roads 20$a$ (FIG. 2A), 20$b$ (FIG. 2B), 20$c$ (FIG. 4B) and alongside regular car traffic 21$a$, 21$b$, 21$c$, 21$d$, 21$e$, 21$f$, 21$g$. In one embodiment, said maneuvers comprise traveling at a velocity exceeding 80 (eighty) kilometers-per-hour. In one embodiment, said maneuvers comprise a centripetal acceleration of above 3 (three) meters-per-second-square (m/s*s). In one embodiment, said width 10-$w$ is between 2 (two) meters and 2.5 (two point five) meters, and said height 10-$h$ is below 2 (two) meters.

In one embodiment, said actuators 6, 7 comprise electrical motors 6$b$, 6$d$ capable of linearly accelerating and de-accelerating the on-road autonomous vehicle 10 at a rate of at least 3 (three) meters-per-second-square (m/s*s), thereby avoiding car-accidents in conjunction with said public roads 20$a$ (FIG. 2A), 20$b$ (FIG. 2B), 20$c$ (FIG. 4B) and regular car traffic 21$a$, 21$b$, 21$c$, 21$d$, 21$e$, 21$f$, 21$g$.

In one embodiment, said lifting (FIG. 3D) is done so as to lift the load 11 to a position which is not more than 50 cm (fifty centimeters) above ground, thereby facilitating a center of gravity which is low enough to facilitate regular car traffic maneuvers in conjunction with said public roads 20$a$ (FIG. 2A), 20$b$ (FIG. 2B), 20$c$ (FIG. 4B) and alongside regular car traffic 21$a$, 21$b$, 21$c$, 21$d$, 21$e$, 21$f$, 21$g$.

In one embodiment, said positioning and straddling comprises: using said three-dimensional representation of surrounding environment to accurately represent the load 11 and position the on-road autonomous vehicle 10 in front to the load, and using slow and controlled acceleration to slowly move forward while maintaining constant and regular spacing between the load 11 and the inner surfaces of the on-road autonomous vehicle 10, until predicting accurate positioning of the on-road autonomous vehicle 10 above the load 11.

In one embodiment, said first liner actuator 2'+2 is a distributed linear actuator comprising several sub-actuators (e.g., four sub-actuators: 2$a$' moving relative to 2$a$, 2$b$' moving relative to 2$b$, 2$c$' moving relative to 2$c$, and 2$d$' moving relative to 2$d$), in which each sub-actuator is associated with one of the wheels, such that the entire upper horizontal structure 3 is operative to move up and down relative to the wheels and ground.

In one embodiment, the sub-actuators are also operative to act as springs or mechanical dumpers for the wheels relative to the upper horizontal structure.

In one embodiment, said first liner actuator is embedded in the first connector 5-cnct, thereby causing only the connector to move up and down relative to ground, and such that the upper horizontal structure 3 remains in place.

Figure 4C:
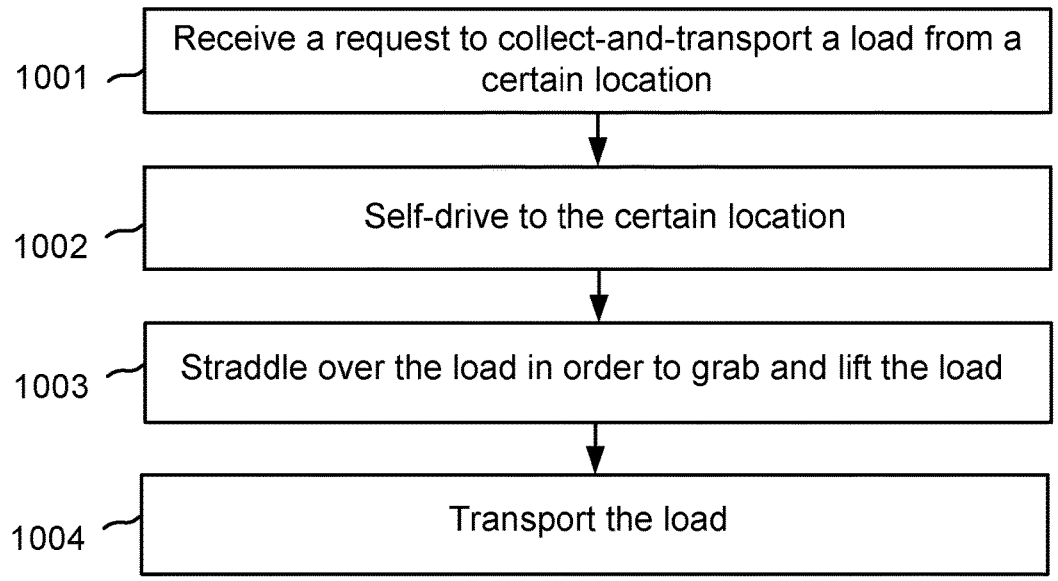
FIG. 4C illustrates one embodiment of a method for autonomously collecting and transporting a load over public roads.
Figure 4D:
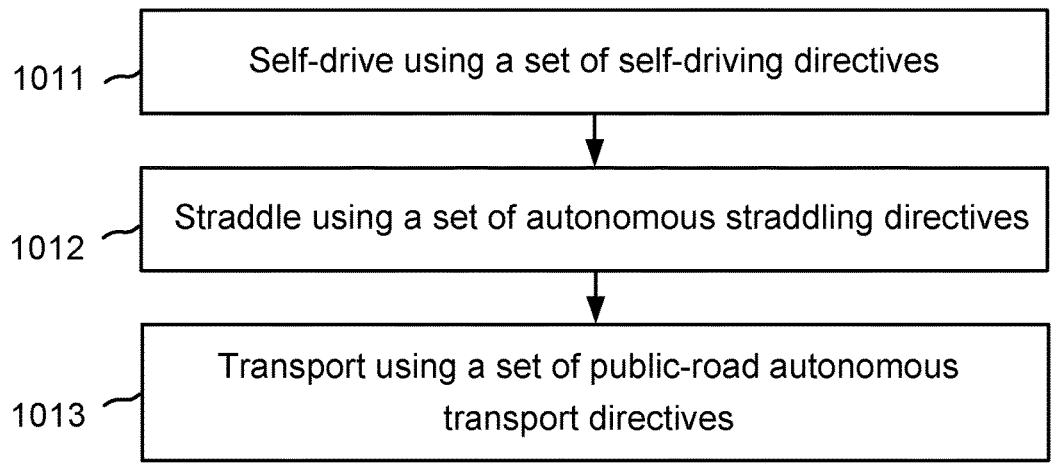
FIG. 4D illustrates one embodiment of another method for autonomously collecting and transporting a load over public roads.

FIG. 4C illustrates one embodiment of a method for autonomously collecting and transporting a load over public roads. In step 1001, receiving, in conjunction with an on-road autonomous vehicle 10, a request to collect-and-transport a load 11 which is currently parked in a certain location 20-$p$. In step 1002, self-driving (FIG. 2A, FIG. 2B, FIG. 2C), by the on-road autonomous vehicle, over public roads 20$a$ (FIG. 2A), 20$b$ (FIG. 2B) and alongside regular car traffic 21$a$, 21$b$, 21$c$, 21$d$, 21$e$, 21$f$, from a current location of the on-road autonomous vehicle to said certain location 20-$p$ of the load 11. In step 1003, upon arrival to said certain location 20-$p$, straddling autonomously (FIG. 3B, and the transition from FIG. 3A to FIG. 3B), by the on-road autonomous vehicle 10, over the load 11, thereby allowing the on-road autonomous vehicle to grab (FIG. 3C) and lift autonomously (FIG. 3D, or the transition from FIG. 3C to FIG. 3D) the load 11 above ground in a linear upward movement that creates a full clearance of the load 11 above ground. In step 1004, transporting autonomously (FIG. 4A, FIG. 4B) the load 11, by the on-road autonomous vehicle 10, over public roads 20$c$ (FIG. 4B) and alongside regular traffic 21$e$ (FIG. 4A), 21$g$ (FIG. 4B), while the load 11 is hanging underneath the on-road autonomous vehicle 10 and such that the entire load 11 maintains said full clearance above ground during transport. In one embodiment, autonomously navigating, by the on-road autonomous vehicle, to a destination location, and lowering the load 11 at the destination location in a linear downward movement that places the load on the ground (a reverse transition from FIG. 3D to FIG. 3C).

FIG. 0.4D illustrates one embodiment of a method for autonomously collecting and transporting a load over public roads. In step 1011, self-driving using a set of public-road self-driving directives, by an on-road autonomous vehicle 10, over public roads 20$a$ (FIG. 2A), 20$b$ (FIG. 2B) and alongside regular car traffic 21$a$, 21$b$, 21$c$, 21$d$, 21$e$, 21$f$, from a current location of the on-road autonomous vehicle to a certain location 20-$p$ of the load 11. In step 1012, upon arrival to said certain location 20-$p$, straddling autonomously (FIG. 3B, and the transition from FIG. 3A to FIG. 3B), using a set of autonomous straddling directives, by the on-road autonomous vehicle 10, over the load 11, thereby allowing the on-road autonomous vehicle to grab (FIG. 3C) and lift autonomously (FIG. 3D, or the transition from FIG. 3C to FIG. 3D) the load 11 above ground in a linear upward movement that creates a full clearance of the load 11 above ground. In step 1013, transporting autonomously (FIG. 4A, FIG. 4B) the load 11 using a set of public-road autonomous transport directives, by the on-road autonomous vehicle 10, over public roads 20c (FIG. 4B) and alongside regular traffic 21e (FIG. 4A), 21g (FIG. 4B), while the load 11 is hanging underneath the on-road autonomous vehicle 10 and such that the entire load 11 maintains said full clearance above ground during transport. In one embodiment, said public-road self-driving directives are fine-tuned to facilitate said self-driving during a period that the on-road autonomous vehicle 10 does not transport the load 11, and is therefore (i) lighter and (ii) has a higher center of gravity; said public-road autonomous transport directives are fine-tuned to facilitate said transporting during a period that the on-road autonomous vehicle 10 transports the load 11, and is therefore (i) heavier and (ii) has a lower center of gravity; and said autonomous straddling directives are fine-tuned to facilitate said straddling by directing a slow approach and slow straddling of the on-road autonomous vehicle 10 over the load 11 and into an accurate final position above the load.

Figure 5A:
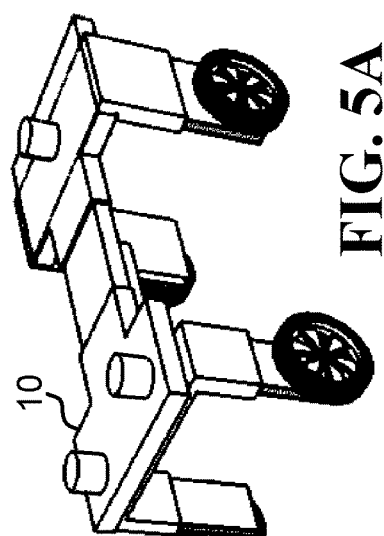
FIG. 5A illustrates one embodiment of an on-road autonomous vehicle self-driving to a location in which a passenger in a cabin is located.

FIG. 5A illustrates one embodiment of an on-road autonomous vehicle 10 self-driving to a location in which a passenger in a cabin is located.

Figure 5B:
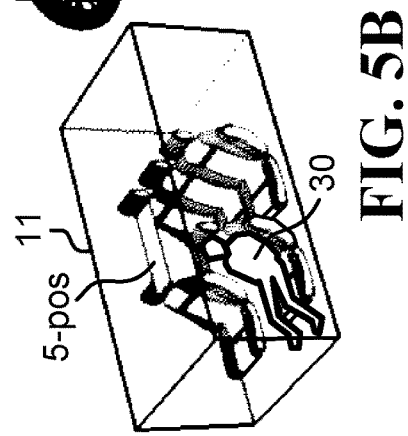
FIG. 5B illustrates one embodiment of the passenger in the cabin awaiting arrival of the on-road autonomous vehicle.

FIG. 5B illustrates one embodiment of the passenger 30 in the cabin 11 awaiting arrival of the on-road autonomous vehicle 10. 5-pos is a position in the cabin 11 that facilitates grabbing or connecting to the cabin 11.

Figure 5C:
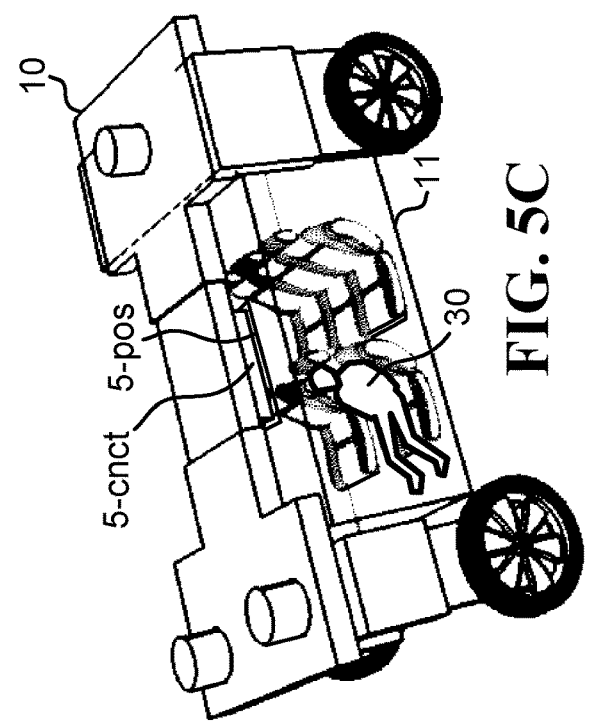
FIG. 5C illustrates one embodiment of the on-road autonomous vehicle picking up the cabin with the passenger.

FIG. 5C illustrates one embodiment of the on-road autonomous vehicle 10 picking up the cabin 11 with the passenger 30. The cabin 11 is now connected to the on-road autonomous vehicle 10 via connector 5-cnct and in conjunction with position 5-pos.

Figure 5D:
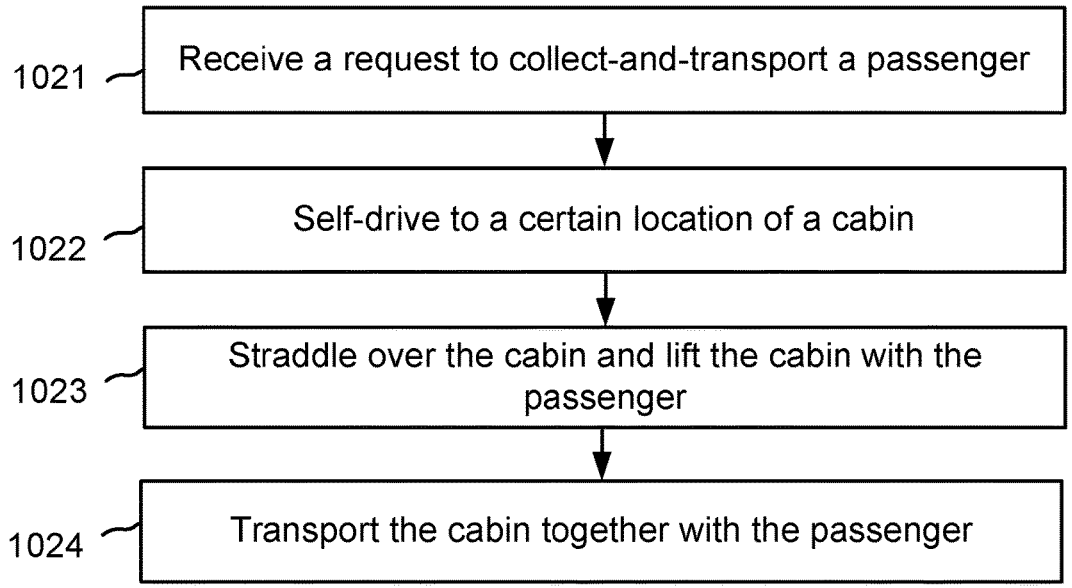
FIG. 5D illustrates one embodiment of a method for autonomously collecting and transporting a passenger in a cabin.

FIG. 5D illustrates one embodiment of a method for autonomously collecting and transporting a passenger in a cabin. In step 1021, receiving, in conjunction with an on-road autonomous vehicle 10 (FIG. 5A), from a passenger 30 (FIG. 5B) associated with a cabin 11 (FIG. 5B) located in a certain location, a request to collect-and-transport the passenger together with the cabin. In step 1022, self-driving (FIG. 2A), by the on-road autonomous vehicle 10, from a current location of the on-road autonomous vehicle to said certain location of the cabin 11 (FIG. 5B). In step 1023, upon arrival to said certain location: (i) confirming that the passenger 30 is indeed in the cabin 11 (FIG. 5B), and (ii) straddling autonomously, by the on-road autonomous vehicle 10, over the cabin 11 (FIG. 3B), thereby allowing the on-road autonomous vehicle 10 to grab and lift autonomously (FIG. 3C, FIG. 3D) the cabin 11, together with the passenger 30, above ground (FIG. 5C). In step 1024, transporting autonomously the cabin 11 together with the passenger 30, by the on-road autonomous vehicle 10, while the cabin 11 is hanging underneath the on-road autonomous vehicle (FIG. 4B). In one embodiment, the method further includes: receiving, in conjunction with the on-road autonomous vehicle 10, a second request to collect-and-transport a cargo 11 which is currently located in a second location 20-p (FIG. 2B); self-driving (FIG. 2A, FIG. 2B, FIG. 2C), by the on-road autonomous vehicle 10, over public roads 20a (FIG. 2A), 20b (FIG. 2B) and alongside regular car traffic 21a, 21b, 21c, 21d, 21e, 21f, from a current location of the on-road autonomous vehicle to said second location 20-p; upon arrival to said second location 20-p, straddling autonomously (FIG. 3B, and the transition from FIG. 3A to FIG. 3B), by the on-road autonomous vehicle 10, over the cargo 11, thereby allowing the on-road autonomous vehicle 10 to grab (FIG. 3C) and lift autonomously (FIG. 3D, or the transition from FIG. 3C to FIG. 3D) the cargo 11 above ground in a linear upward movement that creates a full clearance of the cargo 11 above ground; and transporting autonomously (FIG. 4A, FIG. 4B) the cargo 11, by the on-road autonomous vehicle 10, over public roads 20c (FIG. 4B) and alongside regular traffic 21e (FIG. 4A), 21g (FIG. 4B), while the cargo 11 is hanging underneath the on-road autonomous vehicle 10 and such that the entire cargo 11 maintains said full clearance above ground during transport, thereby facilitating dual use of the on-road autonomous vehicle 10 for both said transporting of the passenger 30 during a certain period of time and said transporting of the cargo 11 during another period of time. In one embodiment, said transporting of the passenger 30 or other passengers is done during the mornings or the evenings and in conjunction with work rush hours, while said transporting of the cargo 11 or other cargo is done during mid-day hours, while most people are working.

Figure 5E:
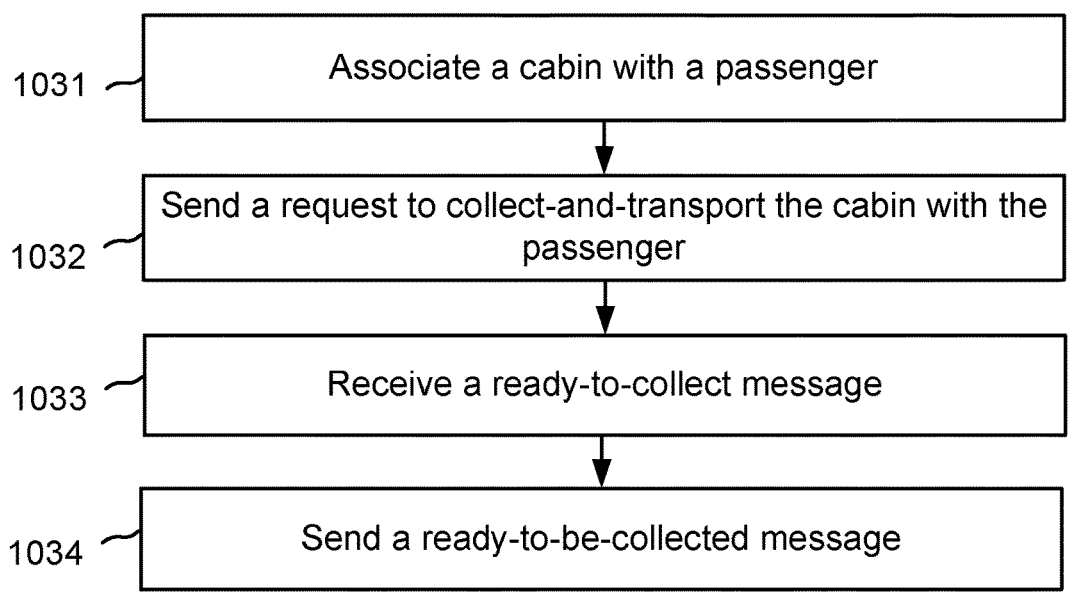
FIG. 5E illustrates one embodiment of a method for requesting autonomous collection and transporting of a passenger in a cabin.

FIG. 5E illustrates one embodiment of a method for requesting autonomous collection and transporting of a passenger in a cabin. In step 1031, associating a cabin 11 with a passenger 30 (FIG. 5B). In step 1032, sending, in conjunction with the cabin 11, a request to collect-and-transport the cabin together with the passenger 30. In step 1033, receiving, in conjunction with the cabin 11, a ready-to-collect message from an on-road autonomous vehicle 10 (FIG. 5A). In step 1034, sending, in conjunction with the cabin 11, a ready-to-be-collected message to the on-road autonomous vehicle 10, thereby facilitating collection and transporting of the passenger 30 in the cabin 11 (FIG. 5C).

FIG. 6A illustrates one embodiment of an on-road autonomous vehicle 10 self-driving to a location 28 (FIG. 6B) in which a functional load 11 is located.

FIG. 6B illustrates one embodiment of the functional load 11 awaiting arrival of the on-road autonomous vehicle 10.

FIG. 6C illustrates one embodiment of the on-road autonomous vehicle 10 picking up and transporting the functional load 11.

FIG. 6D illustrates one embodiment of the functional load 11 after being placed by the on-road autonomous vehicle 10 at a particular location 29 operative to work in conjunction with or support the functional load 11 using an interface 29-rec.

FIG. 6E illustrates one embodiment of the on-road autonomous vehicle 10 driving away after placing the functional load 11 at the particular location.

Figure 6F:
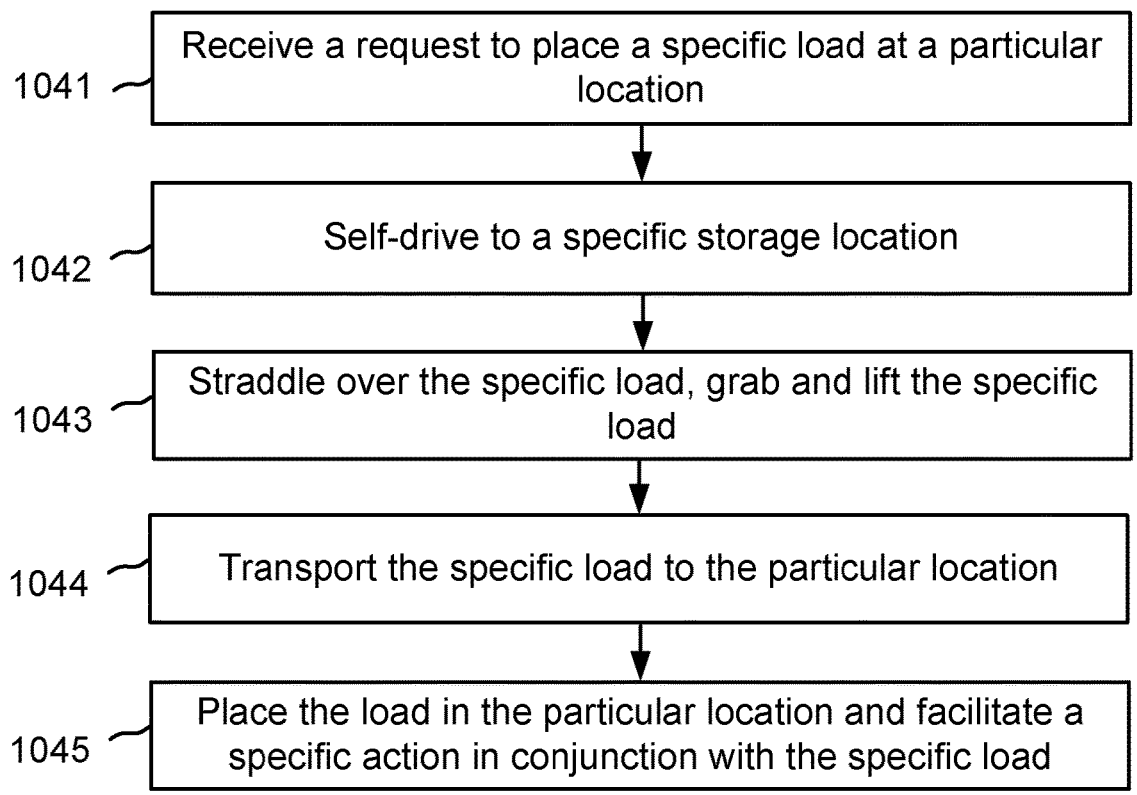
FIG. 6F illustrates one embodiment of a method for autonomously collecting transporting and placing a functional load according to a request.

FIG. 6F illustrates one embodiment of a method for autonomously collecting transporting and placing a functional load according to a request. In step 1041, receiving, in conjunction with an on-road autonomous vehicle 10 (FIG. 6A), a request to place a specific load 11 (FIG. 6B) at a particular location 29 (FIG. 6D), in which the specific load 11 is operative to perform a specific function. In step 1042, self-driving, by the on-road autonomous vehicle 10, to a specific storage location 28 (FIG. 6B) of the specific load 11. In step 1043, upon arrival to said specific storage location 28, straddling autonomously (FIG. 3B, and the transition from FIG. 3A to FIG. 3B), by the on-road autonomous vehicle 10, over the specific load 11, thereby allowing the on-road autonomous vehicle to grab (FIG. 3C) and lift autonomously (FIG. 3D, or the transition from FIG. 3C to FIG. 3D) the specific load 11 above ground in a linear upward movement that creates a full clearance of the specific load 11 above ground. In step 1044, transporting autonomously (FIG. 4B) the specific load 11, by the on-road autonomous vehicle 10, over public roads 20c (FIG. 4B) and alongside regular traffic 21g (FIG. 4B), to the particular location 29 (FIG. 6D), while the specific load 11 is hanging (FIG. 6C) underneath the on-road autonomous vehicle 10 and such that the entire specific load 11 maintains said full clearance above ground during transport. In step 1045, upon arrival to the particular location 29, lowering the specific load 11 at the particular location 29 (FIG. 6D) in a linear downward movement that places the load down (a reverse transition from FIG. 3D to FIG. 3C), thereby facilitating performance of the specific action in conjunction with the particular location 29.

In one embodiment, said linear downward movement creates a physical contact between the specific load 11 and a reception element or interface 29-rec (FIG. 6D) at the particular location 29, thereby enabling said specific function in conjunction with the physical contact.

In one embodiment, the specific function is fluid or gas transfer, and the physical contact with the interface 29-rec, which comprises ducts, enables said fluid or gas transfer.

In one embodiment, the specific function is electrical charge transfer, and the physical contact with the interface 29-rec, which comprises electrical contact, enables said electrical charge transfer.

In one embodiment, said specific function comprises at least one of: (i) fluid transfer such as water or gasoline transfer, (ii) gas transfer such as methane transfer, (iii) electrical charge transfer in which the specific load 11 is a rechargeable battery, (iv) automatic vending in which the specific load 11 is an automatic vending machine, (v) communication relaying in which the specific load 11 is a communication relay or a cellular base station, (vi) waste collection in which the specific load 11 is a waste container, (vii) monitoring, surveillance, or intelligence gathering, and (viii) distribution of objects such as drones, other autonomous vehicles, and munitions.

One embodiment further comprises straddling away (FIG. 6E) from the specific load 11, by the on-road autonomous vehicle 10, thereby leaving the specific load 11 (FIG. 6D) at the particular location 29 to perform said specific function.

FIG. 7A illustrates one embodiment of an on-road autonomous vehicle 10 self-driving to a location 27 in which a functional load 11-func is located.

FIG. 7B illustrates one embodiment of the on-road autonomous vehicle 10 picking up the functional load 11-func, interfacing 5-int with the functional load 11-func, and using a function associated with the functional load 11-func.

FIG. 7C illustrates one embodiment of a convoy of several on-road autonomous vehicles 10a, 10b, 10c, 10d in which one of the on-road autonomous vehicles 10a is carrying a functional load 10-func. 11b, 11c, 11d are general loads.

Figure 7D:
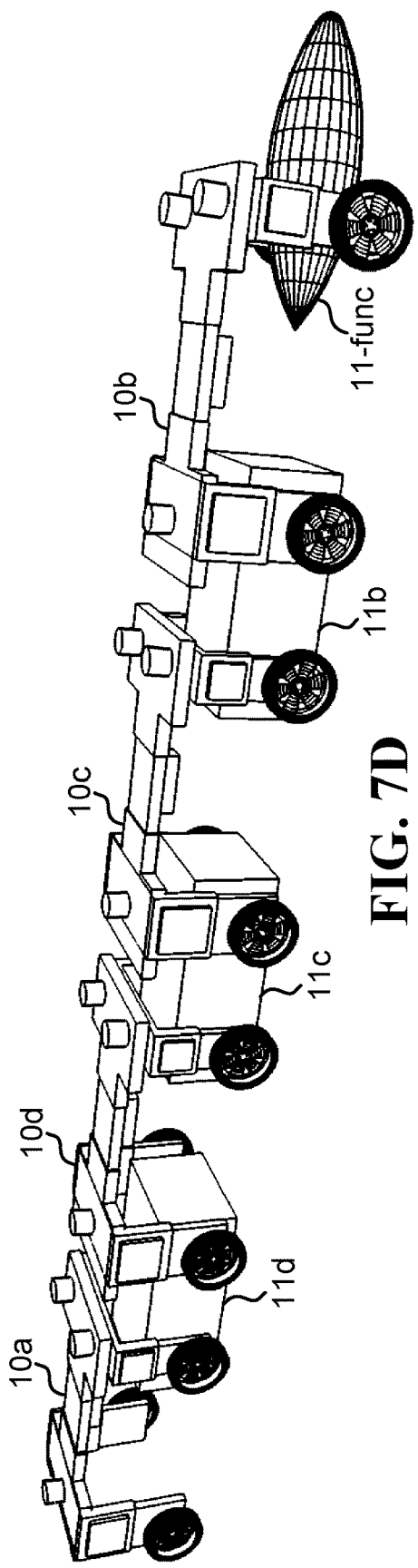
FIG. 7D illustrates one embodiment of the convoy of several on-road autonomous vehicles in which the on-road autonomous vehicles switch at least some of the loads between themselves so as to pass the functional load from one of the on-road autonomous vehicles to another of the on-road autonomous vehicles.

FIG. 7D illustrates one embodiment of the convoy of several on-road autonomous vehicles 10a, 10b, 10c, 10d in which the on-road autonomous vehicles switch at least some of the loads between themselves so as to pass the functional load 11-func from one of the on-road autonomous vehicles 10a to another 10b of the on-road autonomous vehicles.

Figure 7E:
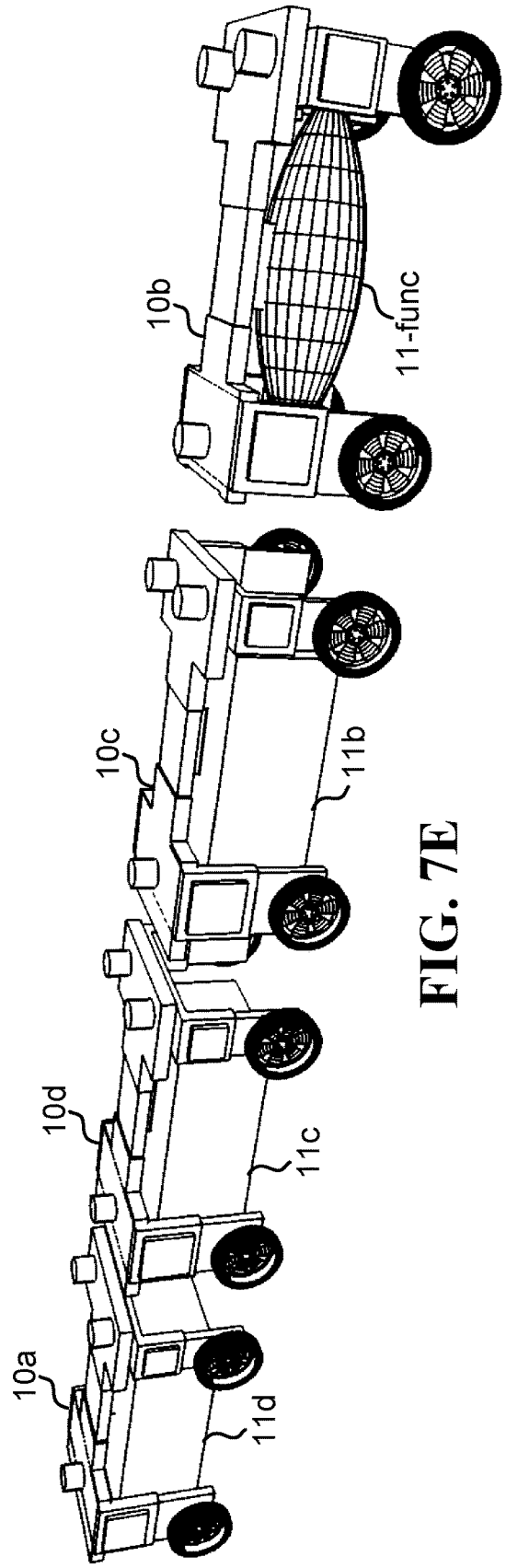
FIG. 7E illustrates one embodiment of the convoy of several on-road autonomous vehicles in which another of the on-road autonomous vehicles is now carrying the functional load.

FIG. 7E illustrates one embodiment of the convoy of several on-road autonomous vehicles 10a, 10b, 10c, 10d in which another of the on-road autonomous vehicles 10b is now carrying the functional load 11-func.

Figure 7F:
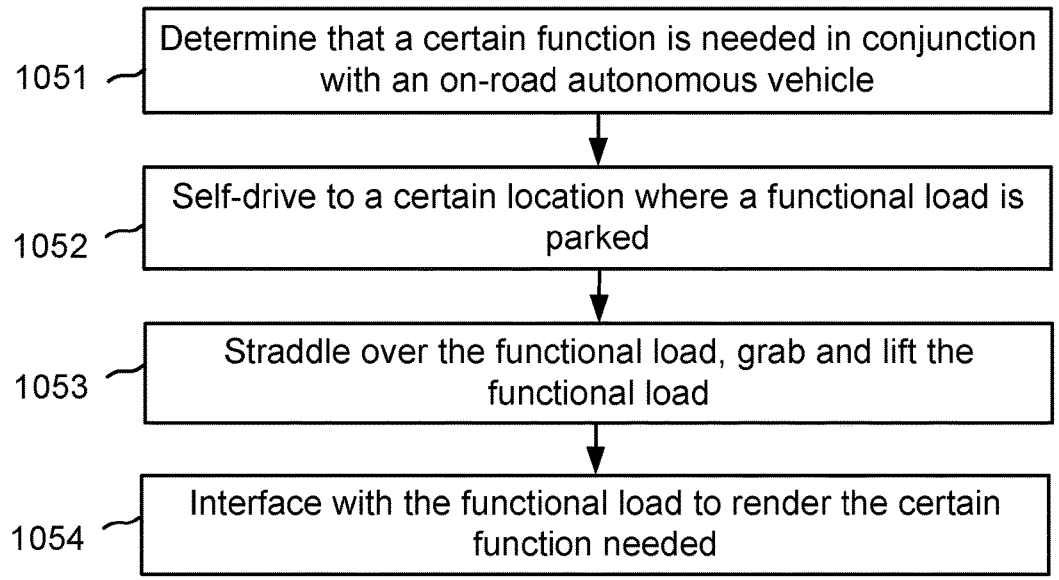
FIG. 7F illustrates one embodiment of a method for autonomously collecting and using a functional load.

FIG. 7F illustrates one embodiment of a method for autonomously collecting and using a functional load. In step 1051, determining, by an on-road autonomous vehicle 10 (FIG. 7A), that a certain function is needed in conjunction with operating said on-road autonomous vehicle. In step 1052, self-driving (FIG. 2A), by the on-road autonomous vehicle 10, from a current location of the on-road autonomous vehicle to a certain location 27 (FIG. 7A) where a functional load 11-func is parked, in which said functional load if operative to render said certain function needed. In step 1053, upon arrival to said certain location (FIG. 7A), straddling autonomously (FIG. 3B, and the transition from FIG. 3A to FIG. 3B), by the on-road autonomous vehicle 10, over the functional load 10-func, thereby allowing the on-road autonomous vehicle to grab (FIG. 3C) and lift autonomously (FIG. 3D, or the transition from FIG. 3C to FIG. 3D) the functional load 10-func above ground in a linear upward movement that creates a full clearance of the load above ground (the result is illustrated in FIG. 7B). In step 1054, interfacing 5-int (FIG. 7B), in a physical manner, between the on-road autonomous vehicle 10 and the functional load 11-func, thereby facilitating said rendering of the certain function needed from the functional load to the on-road autonomous vehicle.

In one embodiment, said certain function needed is a need to charge an electrical battery 12a, 12c (FIG. 7B) belonging to the on-road autonomous vehicle 10, said functional load 11-func is an energy source, and said interfacing 5-int is operative to transfer energy from the functional load 11-func to the on-road autonomous vehicle 10. In one embodiment, said energy source 11-func is a portable battery, and said interfacing 5-int is an electrical interface operative to transport electricity from the portable battery 11-func to the battery 12a, 12c of the on-road autonomous vehicle 10. In one embodiment, said energy source 11-func is a portable fuel cell, and said interfacing 5-int is an electrical interface operative to transport electricity from the fuel cell 11-func to the battery 12a, 12c of the on-road autonomous vehicle 10. In one embodiment, said energy source 11-func is a portable generator with on-board fuel, and said interfacing 5-int is an electrical interface operative to transport electricity from the portable generator 11-func to the battery 12a, 12c of the on-road autonomous vehicle 10.

In one embodiment, said certain function needed is a need for fuel, said functional load 11-func is a fuel tank, and said interfacing 5-int is operative to transfer fuel from the fuel tank 11-func to the on-road autonomous vehicle 10. In one embodiment, said fuel is gasoline or diesel fuel. In one embodiment, said fuel is a fuel operative to drive a fuel cell, such as hydrogen fuel, methanol fuel, ethanol fuel, or methane fuel.

Figure 7G:
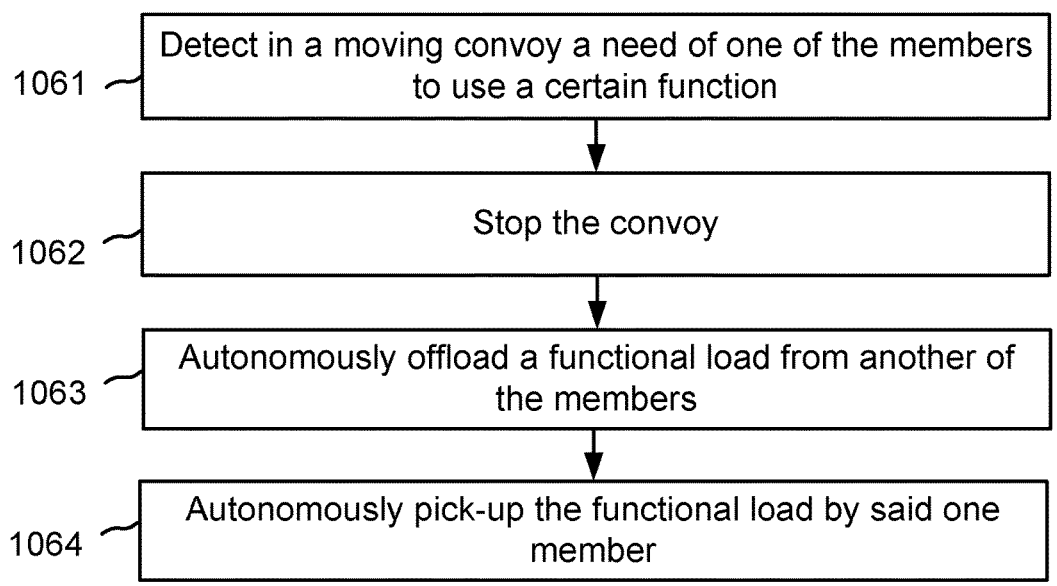
FIG. 7G illustrates one embodiment of a method for exchanging a functional load between at least two on-road autonomous vehicles in a convoy.

FIG. 7G illustrates one embodiment of a method for exchanging a functional load between at least two on-road autonomous vehicles in a convoy. In step 1061, detecting, in a moving convoy (FIG. 7C) comprising on-road autonomous vehicles 10a, 10b, 10c, 10d, a need of one of the on-road autonomous vehicles 10b in the convoy to use a certain function, and further detecting another on-road autonomous vehicle 10a in the moving convoy that currently makes use of said certain function in conjunction with a functional load 11-func carried therewith (i.e., 10a carries 11-func for a certain use, and 10b currently needs 11-func for that use). In step 1062, stopping the convoy (FIG. 7D) as a response to said detections. In step 1063, autonomously offloading, by said another on-road autonomous vehicle 10a, the functional load 11-func, thereby placing the functional load 11-func on ground (e.g., in FIG. 7D, 11-func has now been placed on ground, and 10a which previously carried 11-func has now moved to the back of the convoy). In step 1064, autonomously picking-up the functional load 11-func off ground and interfacing to said functional load by said one of the on-road autonomous vehicles 10b (e.g., FIG. 7E, 10b has now collected 11-func, and load 11b which was previously carried by 10b is now carried by yet another vehicle 10c), thereby facilitating said certain function in conjunction with said one of the on-road autonomous vehicles 10b.

Figure 10A:
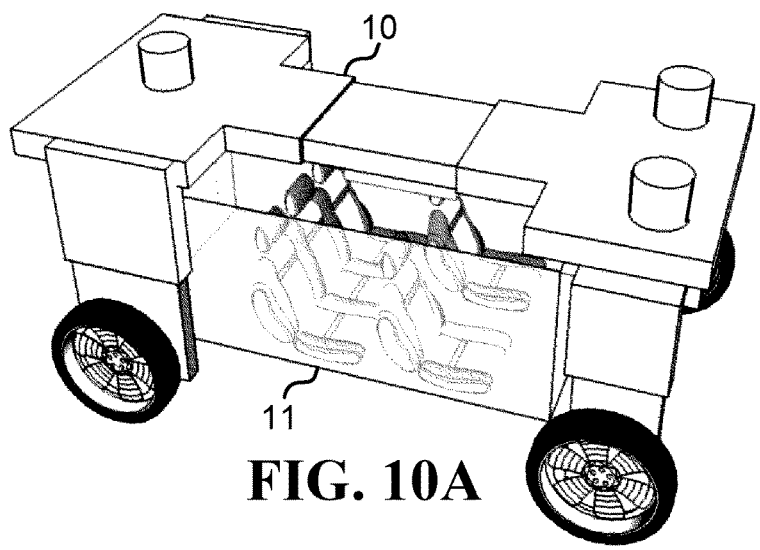
FIG. 10A illustrates one embodiment of an on-road autonomous vehicle carrying a passenger cabin.
Figure 10B:
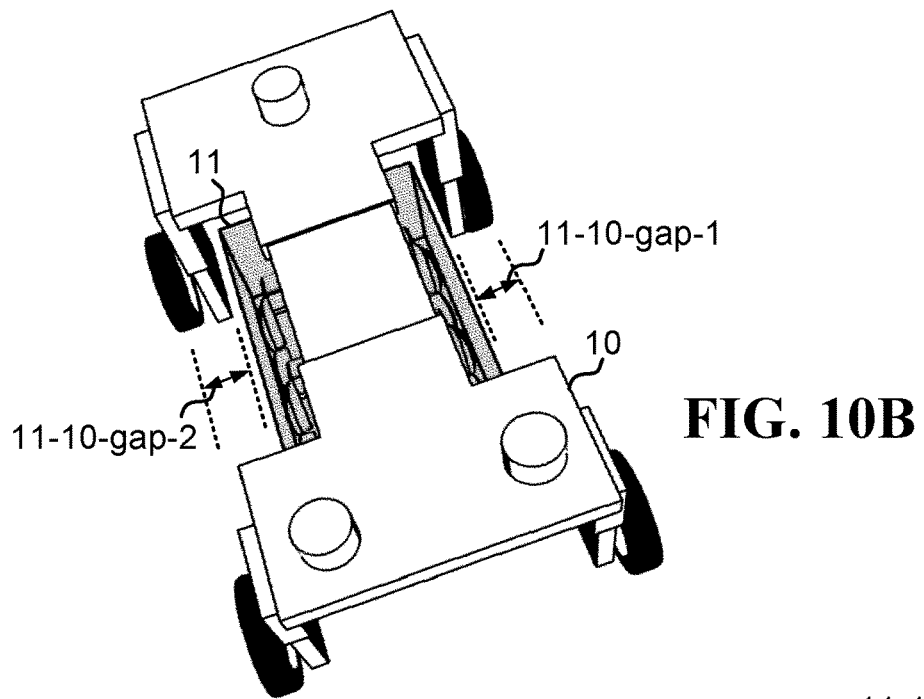
FIG. 10B illustrates one embodiment of the on-road autonomous vehicle providing air gap protection to the passenger cabin.

In one embodiment, said picking-up of the functional load 11-func, by said one of the on-road autonomous vehicles 11b (FIG. 7E), is facilitated by straddling autonomously, by said one of the on-road autonomous vehicle 11b, over the functional load 11-func now on ground (FIG. 7D, 10b is driving/straddling over 11-func), thereby allowing said one of the on-road autonomous vehicle 10b to grab and lift autonomously the functional load 11-func above ground in a linear upward movement that creates a full clearance of the functional load above ground (in FIG. 7E, 10b has lifted 11-func above ground), thereby facilitating said interfacing.

In one embodiment, said certain function is an electrical charging of batteries 12a, 12c belonging to said one of the on-road autonomous vehicles 10b, in which said functional load 11-func in an energy source.

One embodiment further comprising resuming movement by the convoy.

Figure 8A:
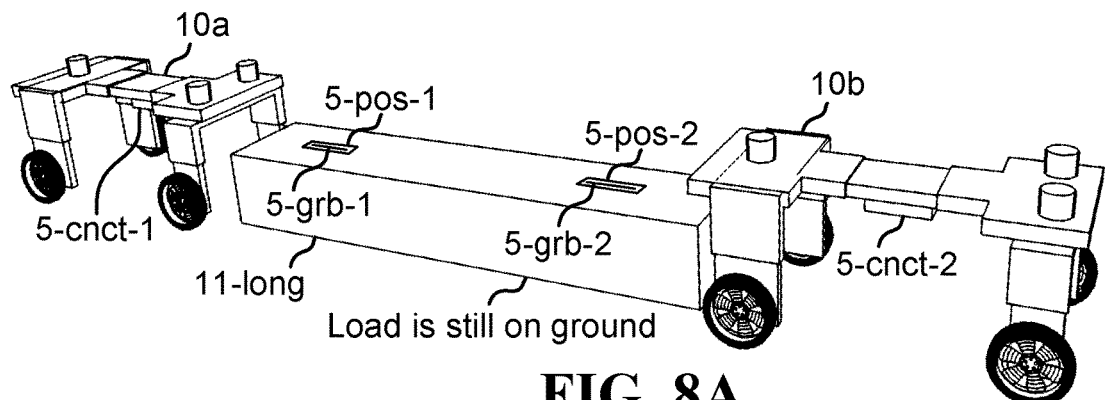
FIG. 8A illustrates one embodiment of two on-road autonomous vehicles getting into positions in conjunction with a load that is too big to be carried by only one on-road autonomous vehicle.

FIG. 8A illustrates one embodiment of two on-road autonomous vehicles 10a, 10b getting into positions in conjunction with a load 11-long that is too big to be carried by only one on-road autonomous vehicle. 5-cnct-1 is a connector of on-road autonomous vehicles 10a and is operative to grab a grabbing point 5-grb-1 of load 11-long at position 5-pos-1. 5-cnct-2 is a connector of on-road autonomous vehicles 10b and is operative to grab a grabbing point 5-grb-2 of load 11-long at position 5-pos-2.

Figure 8B:
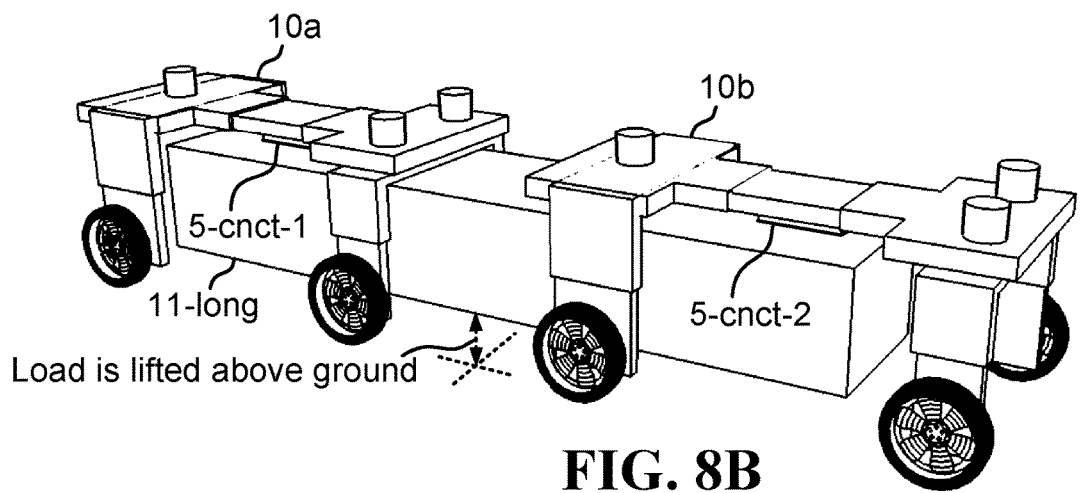
FIG. 8B illustrates one embodiment of the two on-road autonomous vehicles cooperatively lifting the load.

FIG. 8B illustrates one embodiment of the two on-road autonomous vehicles 10a, 10b cooperatively lifting the load 11-long.

Figure 8C:
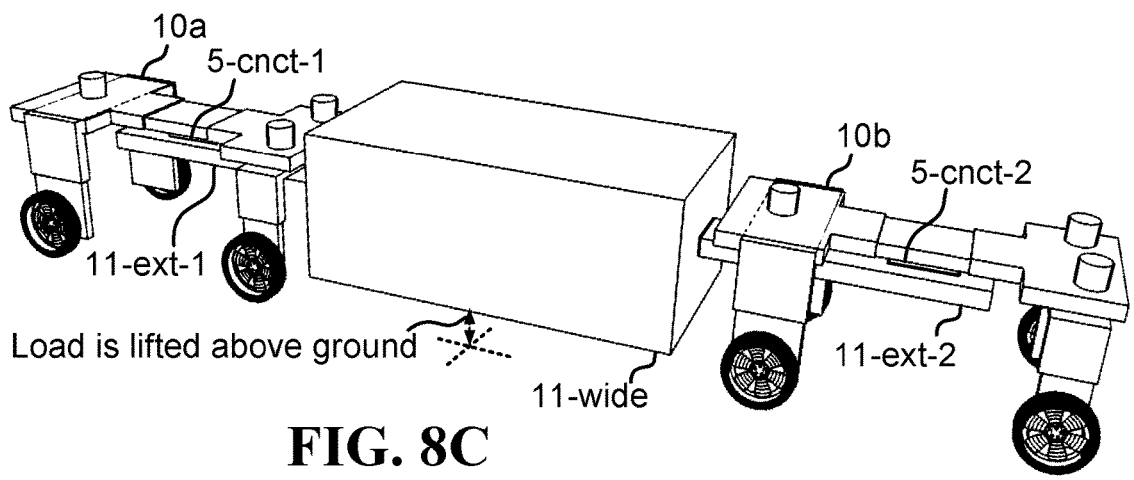
FIG. 8C illustrates one embodiment of the two on-road autonomous vehicles cooperatively lifting another load.

FIG. 8C illustrates one embodiment of the two on-road autonomous vehicles 10a, 10b cooperatively lifting another load 11-wide. 11-ext-1 and 11-ext-2 are extensions of load 11-wide.

Figure 8D:
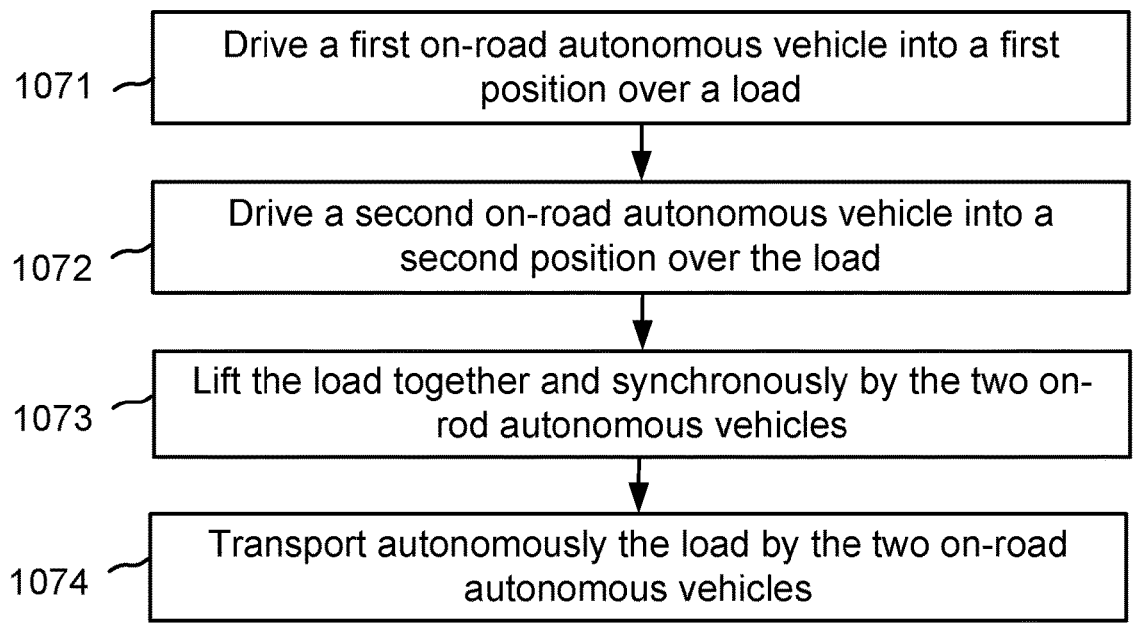
FIG. 8D illustrates one embodiment of a method for cooperatively lifting and transporting a load by at least two on-road autonomous vehicles.

FIG. 8D illustrates one embodiment of a method for cooperatively lifting and transporting a load by at least two on-road autonomous vehicles. In step 1071, driving autonomously, by a first on-road autonomous vehicle 10a (FIG. 8A), into a first predetermined position 5-pos-1 over a load 11-long (FIG. 8A), in which the first predetermined position 5-pos-1 is associated with a first grabbing point 5-grb-1 in the load 11-long. In step 1072, driving autonomously, by a second on-road autonomous vehicle 10b (FIG. 8A), into a second predetermined position 5-pos-2 over the load 11-long, in which the second predetermined position 5-pos-2 is associated with a second grabbing point 5-grb-2 in the load 11-long. In step 1073, lifting the load 11-long together and synchronously (FIG. 8B), by the first and the second on-road autonomous vehicles 10a, 10b in conjunction respectively with the first and second grabbing points 5-grb-1, 5-grb-2, such that: (i) the load 11-long is lifted above ground, (ii) the load 11-long achieves full clearance above ground, and (iii) a weight of the load 11-long is spread between the first 10a and second 10b on-road autonomous vehicles via the first 5-grb-1 and second 5-grb-2 grabbing points respectively. In step 1074, transporting autonomously the load 11-long together and synchronously by the first and second on-road autonomous vehicles 10a, 10b, such that the load 11-long maintains said full clearance above ground during transport.

In one embodiment, the first on-road autonomous vehicle 10a constantly communicates with the second 10b on-road autonomous vehicle during said lifting and transport in order to achieve said synchronicity. In one embodiment, the first on-road autonomous vehicle 10a controls the second on-road autonomous vehicle 10b during said lifting and transport, thereby facilitating the lifting and transport autonomously. In one embodiment, the first on-road autonomous vehicle 10a receives sensory input from the second on-road autonomous vehicle 10b during said lifting and transport, thereby facilitating the lifting and transport autonomously.

In one embodiment, said driving autonomously comprises straddling autonomously over the load, by said first and second on-road autonomous vehicles 10a, 10b.

In one embodiment, said lifting comprises: lowering a first connector 5-cnct-1 of the first on-road autonomous vehicle 10a into mechanical contact with the first grabbing point 5-grb-1, lowering a second connector 5-cnct-2 of the second on-road autonomous 10b vehicle into mechanical contact with the second grabbing point 5-grb-2, grabbing the first grabbing point 5-grb-1 by the first connector 5-cnct-1, grabbing the second grabbing point 5-grb-2 by the second connector 5-cnct-2, and raising synchronously the first and second connectors 5-cnct-1, 5-cnct-2 respectively by the first and second on-road autonomous vehicles 10a, 10b.

In one embodiment, the load 11-long (FIG. 8A, FIG. 8B) is narrower than the on-road autonomous vehicles 10a, 10b, thereby enabling the entire load to be carried under the on-road autonomous vehicles.

In one embodiment, the load 11-wide (FIG. 8C) is wider than the on-road autonomous vehicles 10a, 10b, thereby requiring the load to be supported under the on-road autonomous vehicles by two narrow extension shafts 11-ext-1, 11-ext-2 (FIG. 8C).

Figure 9A:
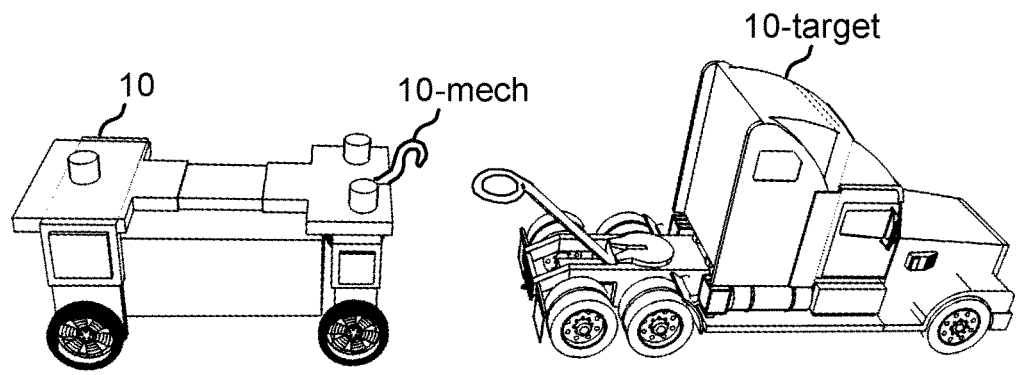
FIG. 9A illustrates one embodiment of an on-road autonomous vehicle getting into position behind a target vehicle.

FIG. 9A illustrates one embodiment of an on-road autonomous vehicle 10 getting into position behind a target vehicle 10-target. 10-mech is a mechanical hook or grabbing mechanism.

Figure 9B:
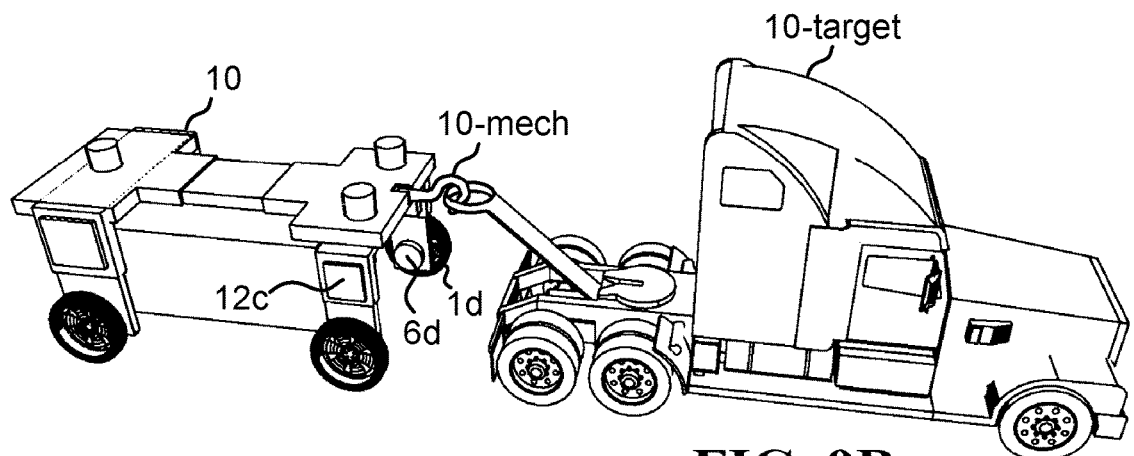
FIG. 9B illustrates one embodiment of the on-road autonomous vehicle now mechanically connected to the target vehicle that pulls the on-road autonomous vehicle thereby allowing for self generation of electrical energy in the on-road autonomous vehicle.

FIG. 9B illustrates one embodiment of the on-road autonomous vehicle 10 now mechanically connected via the mechanical hook or grabbing mechanism 10-mech to the target vehicle 10-target. The target vehicle 10-target pulls the on-road autonomous vehicle thereby allowing the on-road autonomous vehicle to self generate electrical energy.

Figure 9C:
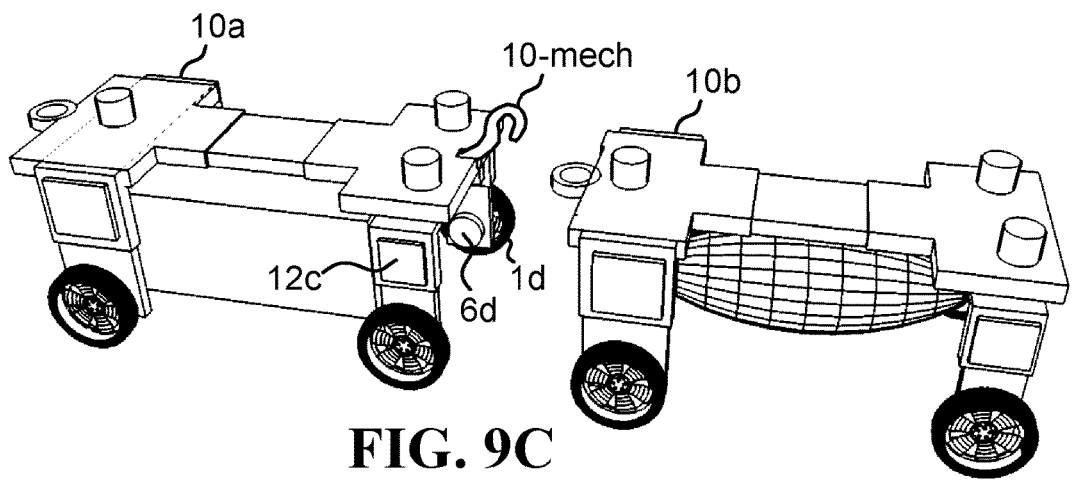
FIG. 9C illustrates one embodiment of an on-road autonomous vehicle getting into position behind another on-road autonomous vehicle in order to be pulled thereby.

FIG. 9C illustrates one embodiment of an on-road autonomous vehicle 10a getting into position behind another on-road autonomous vehicle 10b in order to be pulled thereby.

Figure 9D:
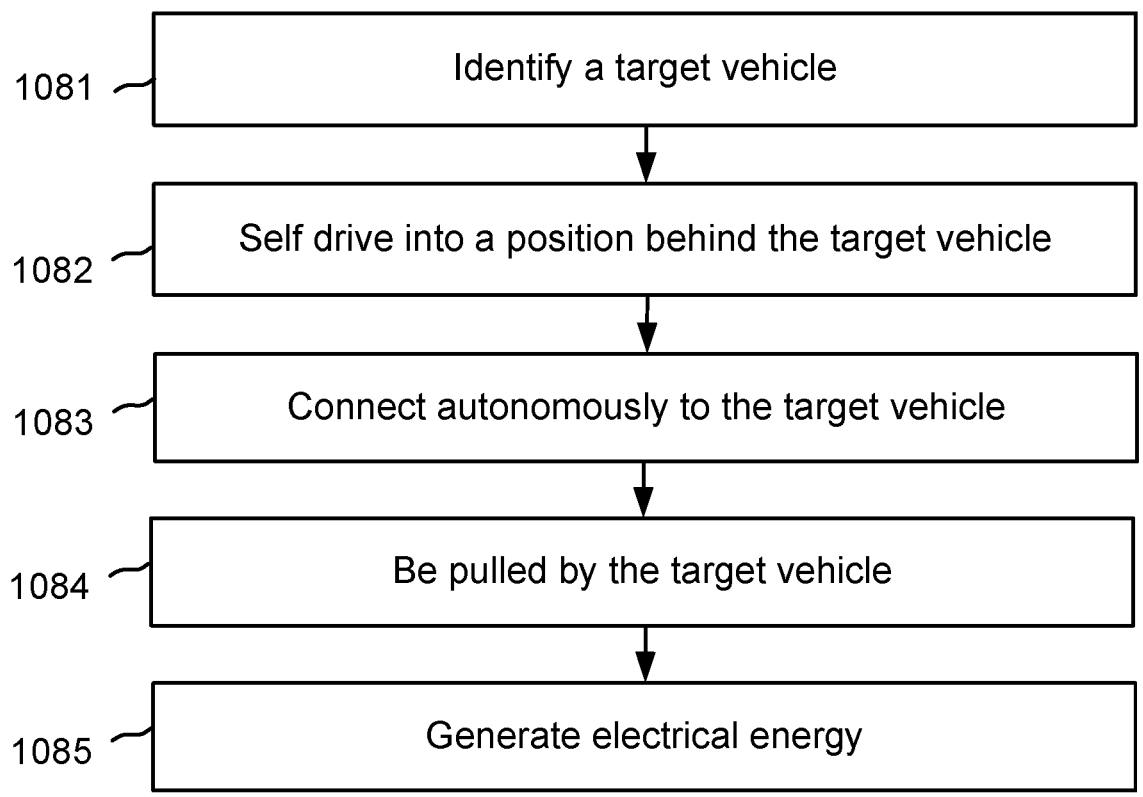
FIG. 9D illustrates one embodiment of a method for charging batteries of an on-road autonomous vehicle on the move.

FIG. 9D illustrates one embodiment of a method for charging batteries of an on-road autonomous vehicle on the move. In step 1081, identifying, by an on-road autonomous vehicle 10 (FIG. 9A), a target vehicle 10-target (FIG. 9A) operative to mechanically pull another vehicle. In step 1082, self driving (FIG. 2A), by the on-road autonomous vehicle 10, into a position behind the target vehicle identified (FIG. 9A). In step 1083, connecting autonomously (FIG. 9B), by the on-road autonomous vehicle 10, to the target vehicle 10-target, by performing an autonomous maneuver in conjunction with a mechanical hook or grabbing mechanism 10-mech, so as to mechanically connect between the on-road autonomous vehicle 10 and the target vehicle 10-target (FIG. 9B). In step 1084, being pulled, by the target vehicle 10-target, thereby causing at least one wheel 1d (FIG. 9B) of the on-road autonomous vehicle 10 to rotate as the on-road autonomous vehicle 10 is pulled by the target vehicle 10-target. In step 1085, generating electrical energy from at least one dynamo 6d (FIG. 9B) connected to the at least one wheel 1d now rotating, thereby allowing the dynamo 6d to charge a battery 12c of the on-road autonomous vehicle 10.

In one embodiment, said connecting autonomously is done during forward movement of both the on-road autonomous vehicle 10 and the target vehicle 10-target.

In one embodiment, said connecting autonomously is done in a stationary state, before forward movement of both the on-road autonomous vehicle 10 and the target vehicle 10-target, in which said forward movement by the target vehicle causes said pulling.

In one embodiment, said mechanical hook or grabbing mechanism 10-mech is a part of the on-road autonomous vehicle 10. In one embodiment, the hook or grabbing mechanism 10-mech is a moving hook. In one embodiment, the hook or grabbing mechanism 10-mech is a mechanical connector.

In one embodiment, the target vehicle 10-target is a second on-road autonomous vehicle 10b (FIG. 9C), in which the second on-road autonomous vehicle 10b synchronizes said autonomous connection with the on-road autonomous vehicle 10 or 10a. In one embodiment, said self driving, by the on-road autonomous vehicle 10 or 10a, into a position behind the target vehicle 10-target, is done in conjunction with the second on-road autonomous vehicle 10b, 10-target also self driving into a position in front of the on-road autonomous vehicle 10 or 10a.

In one embodiment, the dynamo 6d is an electrical engine of the on-road autonomous vehicle 10, in which the electrical engine is operated in a breaking mode, thereby facilitating said generation of electrical energy.

In one embodiment, said identification is done so as to identify the target vehicle 10-target as a vehicle currently traveling in a direction similar to a direction desirable by the on-road autonomous vehicle 10.

FIG. 10A illustrates one embodiment of an on-road autonomous vehicle 10 carrying a passenger cabin 11.

FIG. 10B illustrates one embodiment of the on-road autonomous vehicle 10 providing air gap protection 11-10-gap-1, 11-10-gap-2 to the passenger cabin 11.

Figure 10C:
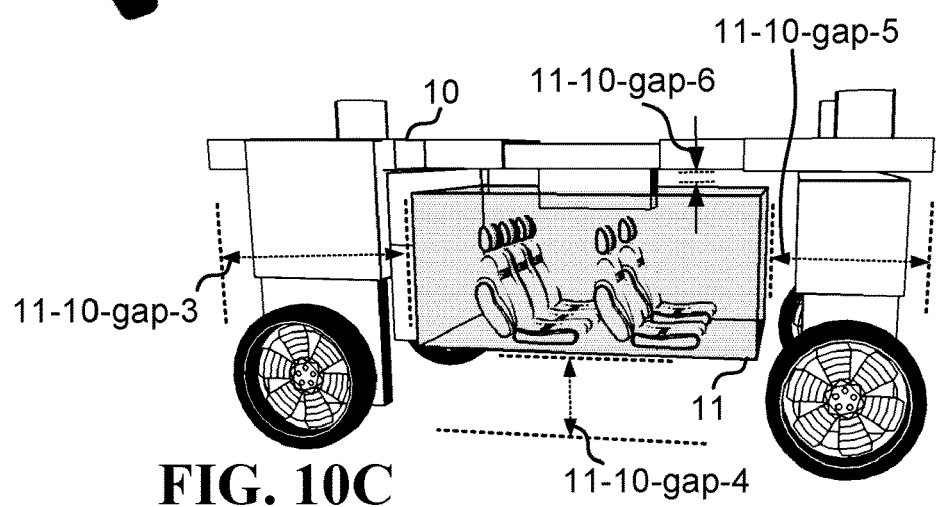
FIG. 10C illustrates one embodiment of the on-road autonomous vehicle providing further air gap protection to the passenger cabin.

FIG. 10C illustrates one embodiment of the on-road autonomous vehicle 10 providing further air gap protection 11-10-gap-3, 11-10-gap-4, 11-10-gap-5, 11-10-gap-6 to the passenger cabin 11.

One embodiment is a system operative to provide a hybrid air-gap and mechanical protection for a passenger cabin. The system includes a passenger cabin 11 (FIG. 10A), and an on-road autonomous vehicle 10 (FIG. 10A) operative to straddle over a passenger cabin 11 and then to pick up the passenger cabin 11, such that the passenger cabin 11 is carried underneath the on-road autonomous vehicle 10 (FIG. 10A). The on-road autonomous vehicle 10 is operative to mechanically enclose the passenger cabin 11 from at least 4 (four) directions, such as to provide mechanical protection from impact with foreign objects, in which said mechanical protection is enhanced by maintaining air-gaps 11-10-gap-1,2,3,4,5,6 between the on-road autonomous vehicle 10 and the passenger cabin 11 in conjunction with the at least 4 (four) directions.

In one embodiment, said at least 4 (four) directions are front, rear, left, and right, in which the front direction is associated with one of the air-gaps 10-11-gap-5 (FIG. 10C) located in front of the passenger cabin 11, the rear direction is associated with one of the air-gaps 10-11-gap-3 (FIG. 10C) located behind the passenger cabin 11, the left direction is associated with one of the air-gaps 10-11-gap-1 (FIG. 10B) located to the left of the passenger cabin 11, and the right direction is associated with one of the air-gaps 10-11-gap-2 (FIG. 10B) located to the right of the passenger cabin 11. In one embodiment, said at least 4 (four) directions are at least 5 (five) directions comprising also an up direction associated with one of the air-gaps 10-11-gap-6 (FIG. 10C) located above the passenger cabin 11. In one embodiment, said at least 5 (five) directions are 6 (directions) directions comprising also a down direction associated with one of the air-gaps 10-11-gap-4 (FIG. 10C) located below the passenger cabin 11.

Figure 11A:
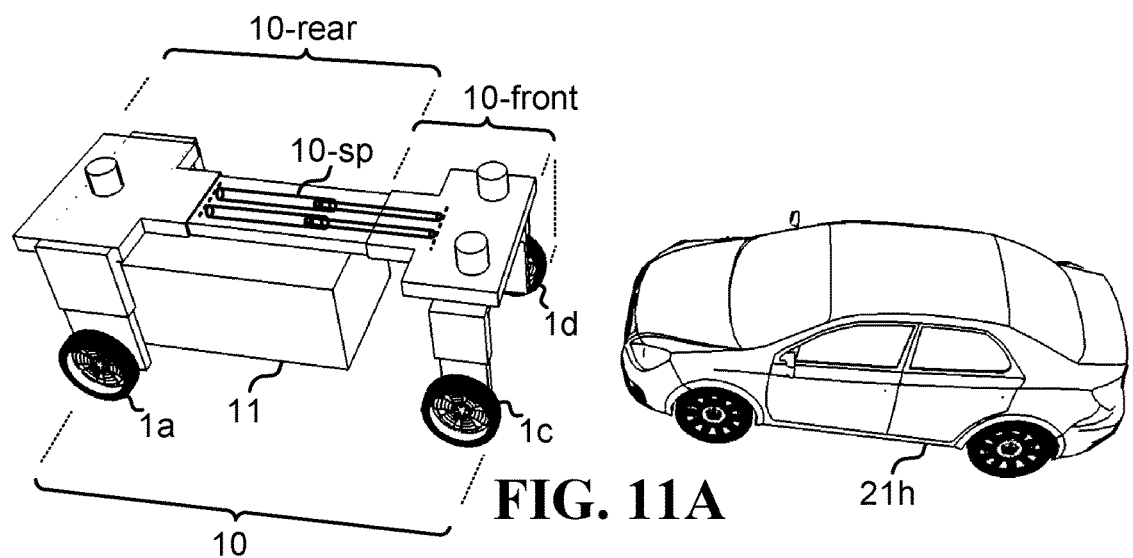
FIG. 11A illustrates one embodiment of an on-road autonomous vehicle about to be hit by a foreign object.

FIG. 11A illustrates one embodiment of an on-road autonomous vehicle 10 about to be hit by a foreign object 21. The on-road autonomous vehicle 10 comprises a rear section 10-rear, a front section 10-front, and a piston or spring 10-sp.

Figure 11B:
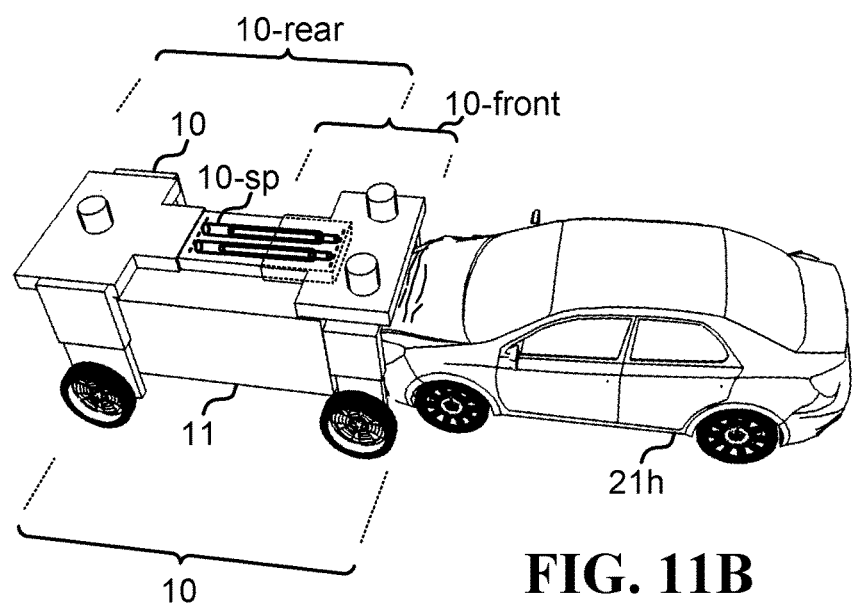
FIG. 11B illustrates one embodiment of the on-road autonomous vehicle being hit by the foreign object.

FIG. 11B illustrates one embodiment of the on-road autonomous vehicle 10 being hit by the foreign object 21h.

One embodiment is a system operative to protect an on-road vehicle from impact with foreign objects. The system includes a front section 10-front (FIG. 11A) of an on-road vehicle 10 (FIG. 11A), in which the front section comprises two front wheels 1c, 1d on which the on-road vehicle is supported. The system further includes a rear section 10-rear (FIG. 11A) of the on-road vehicle 10, in which the rear section comprises two rear wheels 1a, 1b on which the on-road vehicle is further supported, and in which the front section 10-front is mechanically connected to the rear section 10-rear so as to allow movement of the entire front section 10-front relative to the rear sections 10-rear. The system further includes a passenger or cargo cabin 11 of the on-road vehicle 10, in which the passenger or cargo cabin is mechanically connected to the rear section 10-rear without touching the front section 10-front. The system further includes a linear horizontal actuator or horizontal spring 10-sp (FIG. 11A) having two sides, in which the linear horizontal actuator or horizontal spring is mechanically connected to the front section 10-front on one side and to the rear section 10-rear on the other side, and in which the linear horizontal actuator or horizontal spring 10-sp is operative to generate a reaction force pushing the front section 10-front away from the rear section 10-rear when the front section moves toward the rear section. During a collision of the front section 10-front with a foreign object 21h (FIG. 11B), the front section 10-front moves toward the rear section 10-rear (FIG. 11B), thereby causing said reaction force to accelerate the rear section 10-rear away from the foreign object 21h, and thereby avoiding a collision between the passenger or cargo cabin 11 and the foreign object 21h or at least reducing a relative velocity between the passenger or cargo cabin 11 and the foreign object 21h. In one embodiment, the linear horizontal actuator or horizontal spring is a piston.

One embodiment is an on-road vehicle operative to control a length thereof. The an on-road vehicle includes a front section 10-front (FIG. 11A) of the on-road vehicle 10 (FIG. 11A), in which the front section comprises two front wheels 1c, 1d on which the on-road vehicle is supported. The on-road vehicle further includes a rear section 10-rear (FIG. 11A) of the on-road vehicle 10, in which the rear section comprises two rear wheels 1a, 1b on which the on-road vehicle is further supported, and in which the front section 10-front is mechanically connected to the rear section 10-rear so as to allow movement of the entire front section 10-front relative to the rear sections 10-rear. The on-road vehicle further includes a linear horizontal actuator or a piston 10-sp (FIG. 11A) having two sides, in which the linear horizontal actuator or piston is mechanically connected to the front section 10-front on one side and to the rear section 10-rear on the other side, and in which the linear horizontal actuator or piston 10-sp is operative to adjust a distance between the front section 10-front and the rear section 10-rear so as to control a length of the on-road vehicle.

In one embodiment, said length is adjusted to support loads 11 of different lengths to be carried by the on-road vehicle.

In one embodiment, said length is adjusted to support compact length during parking of the on-road vehicle 10.

In one embodiment, said length is adjusted to support extended length during high speed driving of the on-road vehicle 10 in order to protect a load 11 carried by the on-road vehicle by increasing an air-gap 11-10-gap-5 (FIG. 10C) between the load 11 the front section 10-front.

Figure 12A:
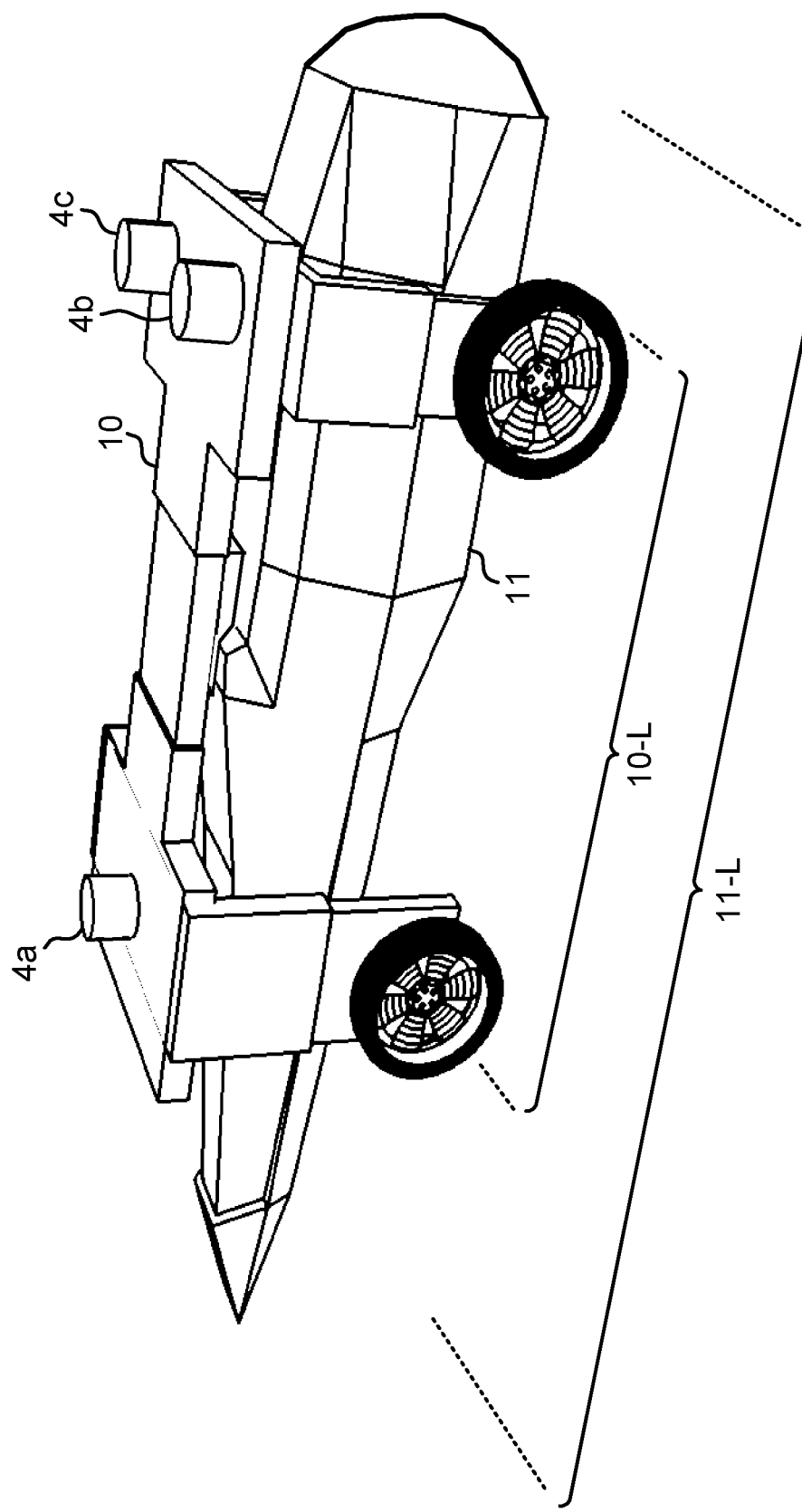
FIG. 12A illustrates one embodiment of an on-road autonomous vehicle carrying a load having a certain aerodynamic design and extending beyond a length of the on-road autonomous vehicle.

FIG. 12A illustrates one embodiment of an on-road autonomous vehicle 10 carrying a load 11 having a certain aerodynamic design and extending beyond a length of the on-road autonomous vehicle.

One embodiment is a combined vehicle-and-load arrangement operative to reduce drag on the vehicle. The combined vehicle-and-load arrangement includes an on-road autonomous vehicle 10 (FIG. 12A) having a first aerodynamic drag coefficient and a load 11 (FIG. 12A) having a certain aerodynamic design. The on-road autonomous vehicle 10 is configured to straddle autonomously over the load 11, thereby allowing the on-road autonomous vehicle 10 to grab and lift autonomously the load 11 above ground in a linear upward movement that creates a full clearance of the load above ground. The combined vehicle-and-load arrangement 10+11 of the on-road autonomous vehicle together with the load now lifted is operative to reduce the first aerodynamic drag coefficient of the on-road autonomous vehicle.

Figure 12B:
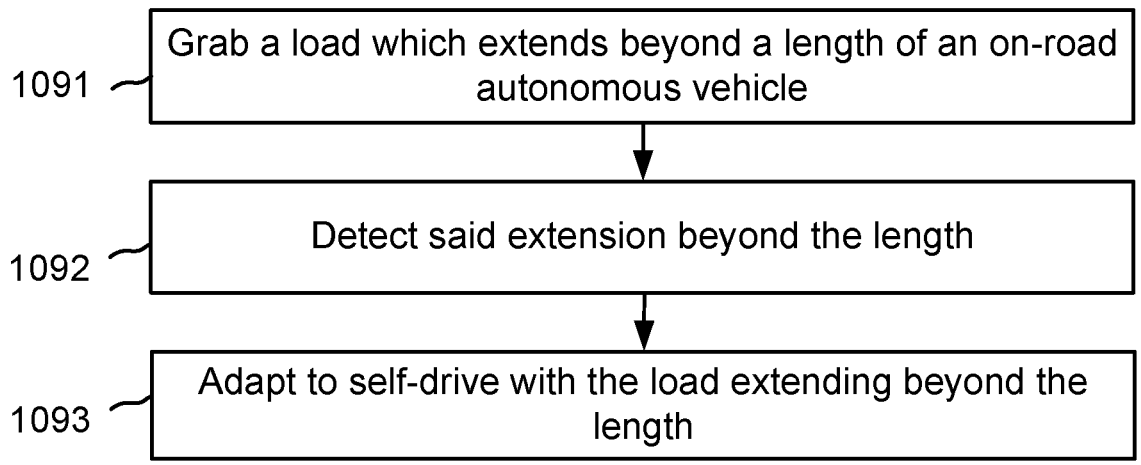
FIG. 12B illustrates one embodiment of a method for adjusting an on-road autonomous vehicle to carry a long load.

FIG. 12B illustrates one embodiment of a method for adjusting an on-road autonomous vehicle to carry a long load. In step 1091, straddling autonomously, by an on-road autonomous vehicle 10 having a certain length 10-L (FIG. 12), over a load 11 having a greater length 11-L (FIG. 12), thereby allowing the on-road autonomous vehicle 10 to grab and lift autonomously the load 11 above ground in a linear upward movement that creates a full clearance of the load above ground, and resulting in the load 11 extending beyond said certain length 10-L. In step 1092, detecting, by sensors 4a, 4b, 4c (FIG. 12) belonging to the on-road autonomous vehicle 10, said extension of the load 11 beyond said certain length 10-L. In step 1093, altering, according to said detection, at least a first parameter in conjunction with an autonomous driving procedure of the on-road autonomous vehicle, thereby adapting the on-road autonomous vehicle 10 to self-drive with the load 11 extending beyond said certain length 10-L.

In one embodiment, the first parameter is an effective length of the on-road autonomous vehicle, in which said effective length is increased from the certain length 10-L to the greater length 11-L.

One embodiment is a system operative to autonomously collect and transport a passenger 30 in a cabin 11 (FIG. 5C), comprising: an autonomous on-road vehicle 10 operative to straddle over (FIG. 3B, and the transition from FIG. 3A to FIG. 3B) loads 11 such as cabins operative to contain passengers 30 (FIG. 5C); and a cabin 11 operative to contain passengers 30 (FIG. 5B), in which the cabin 11 is currently located at a certain parking location without any passengers inside (the cabin 11 as shown in FIG. 5B, but without the passenger 30 inside); wherein, the system is configured to: receive a request to collect-and-transport a passenger 30 which is currently located or is soon-to-be-located in a pick-up location; self-drive, as a response to said request, the on-road autonomous vehicle 10, to said certain parking location; upon arrival of the on-road autonomous vehicle 10 to said certain parking location: straddle autonomously (FIG. 3B, and the transition from FIG. 3A to FIG. 3B), the on-road autonomous vehicle 10, over the cabin 11, thereby allowing the on-road autonomous vehicle 10 to grab and lift autonomously (the transition between FIG. 3C and FIG. 3D) the cabin 11; self-drive the on-road autonomous vehicle 10 to said pick-up location, while the cabin 11 is hanging underneath the on-road autonomous vehicle; and pick-up the passenger 30 (FIG. 5C) at the pick-up location.

One embodiment is a system operative to transport passengers in a cabin and also transport cargo loads, comprising: an autonomous on-road vehicle 10 operative to straddle over (FIG. 3A, FIG. 3B) loads 11 such as cabins operative to contain passengers and such as cargo loads; a cabin 11 operative to contain passengers 30 (FIG. 5C), in which the cabin is currently located at a certain parking location; and a cargo load 11 (FIG. 2C); wherein, the system is configured to: autonomously transport the cargo load 11 (FIG. 4B), using the autonomous on-road vehicle 10, to a certain location; autonomously release the cargo load 11 at the certain location (the transition from FIG. 3D to FIG. 3C to FIG. 3B and to FIG. 3A); self-drive the on-road autonomous vehicle 10 (FIG. 2A), which is now free of the cargo load, to the certain parking location; upon arrival of the on-road autonomous vehicle 10 to said certain parking location: straddle autonomously, the on-road autonomous vehicle, over the cabin, thereby allowing the on-road autonomous vehicle to grab and lift autonomously the cabin; self-drive the on-road autonomous vehicle to a pick-up location, while the cabin is hanging underneath the on-road autonomous vehicle; and pick-up a passenger at the pick-up location (FIG. 5C) into the cabin.

One embodiment is a system operative to transport both passengers in a towed cabin and towed cargo loads, comprising: an autonomous on-road vehicle operative to tow loads such as towed cabins operative to contain passengers and such as towed cargo loads; a towed cabin operative to contain passengers, in which the towed cabin is currently located at a certain parking location; and a towed cargo load; wherein, the system is configured to: autonomously transport the towed cargo load, using the autonomous on-road vehicle, to a certain location; autonomously release the towed cargo load at the certain location; self-drive the on-road autonomous vehicle, which is now free of the towed cargo load, to the certain parking location; upon arrival of the on-road autonomous vehicle to said certain parking location: connect the towed cabin, thereby allowing the on-road autonomous vehicle to autonomously tow the towed cabin; self-drive the on-road autonomous vehicle to a pick-up location, while the towed cabin is hanging behind the on-road autonomous vehicle; and pick-up a passenger at the pick-up location into the cabin.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for autonomously collecting and transporting a passenger in a cabin, comprising:
   receiving, in conjunction with an on-road autonomous vehicle, a request to collect-and-transport a passenger inside a cabin located in a certain location;
   self-driving, by the on-road autonomous vehicle, from a current location of the on-road autonomous vehicle to said certain location of the cabin;
   upon arrival to said certain location: straddling autonomously, by the on-road autonomous vehicle, over the cabin, thereby allowing the on-road autonomous vehicle to grab and lift autonomously the cabin together with the passenger above ground; and
   transporting autonomously the cabin together with the passenger, by the on-road autonomous vehicle, while the cabin is hanging underneath the on-road autonomous vehicle.

2. The method of claim 1, wherein the method further comprises:
   receiving, in conjunction with the on-road autonomous vehicle, a second request to collect-and-transport a cargo which is currently located in a second location;
   self-driving, by the on-road autonomous vehicle, over public roads and alongside regular car traffic, from a current location of the on-road autonomous vehicle to said second location;
   upon arrival to said second location, straddling autonomously, by the on-road autonomous vehicle, over the cargo, thereby allowing the on-road autonomous vehicle to grab and lift autonomously the cargo above ground in a linear upward movement that creates a full clearance of the cargo above ground; and
   transporting autonomously the cargo, by the on-road autonomous vehicle, over public roads and alongside regular traffic, while the cargo is hanging underneath the on-road autonomous vehicle and such that the entire cargo maintains said full clearance above ground during transport,
   thereby facilitating dual use of the on-road autonomous vehicle for both said transporting of the passenger during a certain period of time and said transporting of the cargo during another period of time.

* * * * *